United States Patent
Shafer

(10) Patent No.: US 11,684,903 B2
(45) Date of Patent: Jun. 27, 2023

(54) MICROSCALE CHEMICAL REACTORS

(71) Applicant: Daniel Shafer, Corvallis, OR (US)

(72) Inventor: Daniel Shafer, Corvallis, OR (US)

( * ) Notice: Subject to any disclaimer, the term of this patent is extended or adjusted under 35 U.S.C. 154(b) by 37 days.

(21) Appl. No.: 16/663,333

(22) Filed: Oct. 24, 2019

(65) Prior Publication Data

US 2020/0129951 A1   Apr. 30, 2020

Related U.S. Application Data

(60) Provisional application No. 62/750,096, filed on Oct. 24, 2018, provisional application No. 62/836,303, filed on Apr. 19, 2019.

(51) Int. Cl.
*B01J 19/00* (2006.01)
*B01J 37/02* (2006.01)
(Continued)

(52) U.S. Cl.
CPC ......... *B01J 19/0093* (2013.01); *B01J 16/005* (2013.01); *B01J 37/0009* (2013.01); *B01J 37/0215* (2013.01); *B01J 37/0217* (2013.01); *B01J 37/0225* (2013.01); *C01B 3/38* (2013.01); *C10G 3/42* (2013.01); *B01J 2219/0099* (2013.01); *B01J 2219/00795* (2013.01); *B01J 2219/00822* (2013.01); *B01J 2219/00833* (2013.01); *B01J 2219/00835* (2013.01);
(Continued)

(58) Field of Classification Search
CPC .... B01J 19/0093; B01J 16/005; B01J 37/009; B01J 37/0215; B01J 37/0217; B01J 37/0225; B01J 2219/00795; B01J 2219/00822; B01J 2219/00833; B01J 2219/00835; B01J 2219/00855; B01J 2219/00882; B01J 2219/00891; B01J 2219/0099; C01B 3/38; C10G 3/42
USPC .......................................................... 502/439
See application file for complete search history.

(56) References Cited

U.S. PATENT DOCUMENTS 3,305,393 A   2/1967  Breckenridge
3,959,520 A   5/1976  Hoyer et al.
(Continued)

FOREIGN PATENT DOCUMENTS

CA         2846381 A1     3/2013
DE   102013002213 B4     6/2016
(Continued)

OTHER PUBLICATIONS

International Search Report and Written Opinion, dated Mar. 20, 2020.

*Primary Examiner* — Brian A McCaig

(57) ABSTRACT

A catalytic microscale reactor with spiral reactor geometry may have a high surface area to volume ratio, high catalytic surface area, high heat transfer surface area, long residence time, and high single pass conversion. The catalytic surface may be treated with microsphere spacer particles which serve to maintain the space between them at an engineered distance without the need for precise manufacturing techniques. The design of the reactor may allow for a catalyst surface to be removed, uncoiled, refurbished, and recoiled in an automated continuous process. An automated continuous process may be suitable both for initially preparing a new catalytic surface as well as refurbishing a fouled catalytic surface and may reduce the time and cost to prepare a new surface.

23 Claims, 24 Drawing Sheets

(51) Int. Cl.
  *B01J 16/00* (2006.01)
  *C01B 3/38* (2006.01)
  *C10G 3/00* (2006.01)
  *B01J 37/00* (2006.01)

(52) U.S. Cl.
  CPC ............... *B01J 2219/00855* (2013.01); *B01J 2219/00882* (2013.01); *B01J 2219/00891* (2013.01)

(56) References Cited

U.S. PATENT DOCUMENTS

| | | | |
|---|---|---|---|
| 4,139,134 | A | 2/1979 | Collins |
| 4,193,793 | A | 3/1980 | Cheung |
| 4,529,718 | A | 7/1985 | Dupin |
| 5,326,537 | A | 7/1994 | Cleary |
| 5,626,916 | A | 5/1997 | Kishi et al. |
| 5,814,368 | A | 9/1998 | Yamada et al. |
| 7,482,303 | B2 | 1/2009 | Bosteels |
| 8,263,027 | B2 | 9/2012 | Girlea et al. |
| 8,597,518 | B2 | 12/2013 | Parnas et al. |
| 9,101,903 | B2 | 8/2015 | Zikeli et al. |
| 9,498,751 | B2 | 11/2016 | Yin et al. |
| 9,592,498 | B2 | 3/2017 | Larcher et al. |
| 9,895,681 | B2 | 2/2018 | Xu et al. |
| 2003/0144134 | A1 | 7/2003 | Hampden-Smith et al. |
| 2005/0276743 | A1 | 12/2005 | Lacombe et al. |
| 2007/0031877 | A1 | 2/2007 | Stabler et al. |
| 2009/0145860 | A1 | 6/2009 | Allen et al. |
| 2010/0210008 | A1 | 8/2010 | Strand et al. |
| 2010/0224129 | A1 | 9/2010 | Malecki et al. |
| 2010/0247401 | A1 | 9/2010 | Barthe et al. |
| 2010/0273085 | A1 | 10/2010 | Natter et al. |
| 2012/0176681 | A1 * | 7/2012 | Chang ............ C23C 18/1216 359/614 |
| 2013/0089925 | A1 | 4/2013 | Damren et al. |
| 2015/0010874 | A1 | 1/2015 | Ghazvini et al. |
| 2017/0145580 | A1 | 5/2017 | Dolan et al. |
| 2017/0306282 | A1 | 10/2017 | Hewitt et al. |
| 2018/0258381 | A1 * | 9/2018 | Jovanovic ............ C12M 29/00 |

FOREIGN PATENT DOCUMENTS

| | | | |
|---|---|---|---|
| EP | 1060014 B1 | 7/2002 | |
| GB | 1169719 A | 11/1969 | |
| GB | 1438784 A | 6/1976 | |
| WO | WO2004108261 A1 | 12/2004 | |
| WO | WO2014110604 A2 | 7/2014 | |
| WO | WO-2017087535 * | 5/2017 | ............ C12M 1/00 |
| WO | WO2017108248 A1 | 6/2017 | |

* cited by examiner

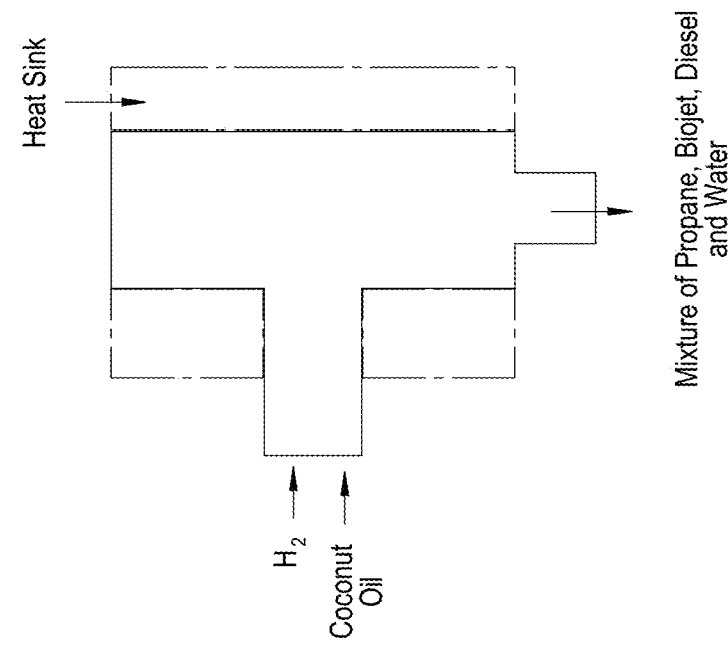
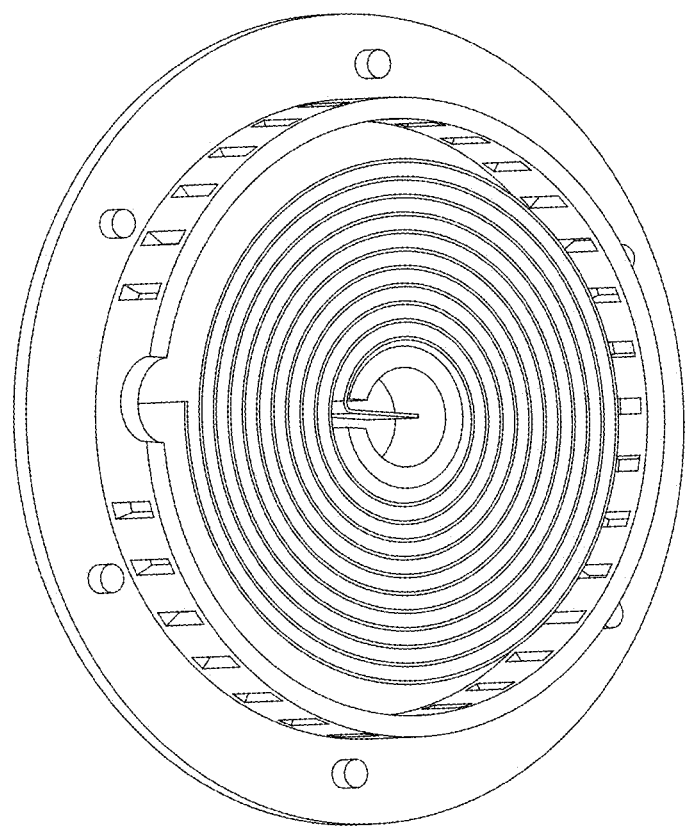
Fig. 14

MICROSCALE CHEMICAL REACTORS

CROSS-REFERENCE TO RELATED APPLICATIONS

This application claims priority to, and the benefit of, U.S. Provisional Patent Application No. 62/750,096 filed Oct. 24, 2018 and U.S. Provisional Patent Application No. 62/836,303 filed Apr. 19, 2109, both titled "Microscale Chemical Reactors", and both of which are incorporated by reference.

BACKGROUND

Catalysts are materials used in a variety of chemical reactions which have commercial importance across a wide range of industries. Catalysts reduce the activation energy threshold for non-spontaneous chemical reactions to proceed. Catalysts improve the rate of chemical reactions and help increase extent of reaction, and thereby drive chemical reactions toward completion. Catalysts can be composed of a variety of different materials but are typically transition group metals on the Periodic Table and frequently include precious transition metals such as Platinum and Palladium.

SUMMARY

A method of producing a reactive component may include continuously feeding a substrate past a first processing apparatus, wherein the first processing apparatus deposits a reactive substance on the substrate. The method may further include continuously feeding the substrate past a second processing apparatus, wherein the second processing apparatus prepares a surface of the substrate to receive the reactive substance. The reactive coating may include a catalytic coating. The reactive coating may include a biofilm. The substrate may have previously been used as part of a reactive component. The method may further include applying spacers to the substrate.

A method of continuously producing a catalytic surface may include obtaining a metallic substrate rolled into a first coil, placing the coil onto a first real, rolling the metallic substrate through a first phase which sands the surface of the metallic substrate, rolling the metallic substrate through a second phase cleaning the surface of the metallic substrate, rolling the metallic substrate through a third phase depositing spacer particles onto the surface of the metallic substrate, rolling the metallic substrate through a fourth phase cleaning the surface of the metallic substrate, rolling the metallic substrate through a fifth phase depositing catalyst particles onto the surface of the metallic substrate, and rolling the treated metallic substrate into a second coil on a second real. The method may further include rolling the metallic substrate through a sixth phase annealing the surface of the metallic substrate. The first through fifth phases may treat both sides of the metallic substrate. The fifth phase depositing catalyst particles may deposits the catalyst particles by: chemical vapor deposition, atomic layer deposition, 3D printing, or gel solvent deposition.

An apparatus for continuously producing a catalytic surface may include a first real for accommodating a coiled metallic substrate at a first end of the apparatus, a second real for accommodating a treated coiled metallic substrate at a second end of the apparatus, a rotary engine for moving the coiled metallic substrate from the first real to the second real, a sanding element, a first cleaning element, an element for depositing spacer particles, a second cleaning element, and an element configured to deposite catalyst particles. The sanding element, first cleaning element, spacer particle depositing element, second cleaning element, catalyst depositing element, and annealing element may treat both sides of the metallic substrate. The apparatus may further include an annealing element.

A chemical reactor may include a housing having a first port a second port, a substrate wound to form a substantially unidirectional spiraling flow path between the first port and the second port, and a reactive coating applied to the surface of the substrate. The reactive coating may include a catalytic coating. The reactive coating may include a biofilm. The reactive coating may be applied to a first side of the substrate, and a second coating may be applied to a second side of the substrate.

A chemical reactor may include an outer housing with a first port at the edge of the outer housing, and a second part port at the center of, and positioned normal to, the base of the outer housing, a substrate coiled around itself to form a single, unidirectional, spiraling flow path beginning at the first port and ending at the second port, a heat conductive element contacting the substrate coil positioned between the base of the outer housing and the substrate coil, and a catalytic coating applied to the surface of the substrate. The chemical reactor may further include a plurality of spacer particles integrally applied to the surface of the substrate. The spacer particles may include aluminum oxide microspheres. The spacer particles may be approximately 0.5 mm microspheres. The chemical reactor may further include a second heat conductive element contacting the substrate coil between the base of the outer housing and the substrate coil, positioned on the opposite side of the substrate coil relative to the position of the first heat conductive element. The outer housing may be a cylinder. The outer housing may be a polygon base prism. The single, unidirectional, spiraling flow path may be non-circular. The substrate may be a metal. The substrate may be stainless steel. The substrate may be plastic. The catalytic coating may include a transition metal. The catalytic coating may include: Pt, Pd, Ag, Au, Ni, Mo, a Ni—Pd alloy, or a Ni—Mo alloy. The catalytic coating may include an alkaline earth metal or an alkaline earth metal oxide. The catalytic coating may include a carbon catalyst. The catalytic coating may include a biofilm. The biofilm may include bacteria. The biofilm may include an enzyme. The catalytic coating may be applied to both sides of the substrate. The catalytic coating applied to the substrate may include 100 nm catalyst crystals. The single, unidirectional spiraling flow path may have an approximate width between 0.5 mm and 1.5 mm. The first port may be an inlet port and the second port may be an outlet port. The single, unidirectional, spiraling flow path may flow inward along the spiral. The chemical reactor may further include a fluid flowing through the reactor, wherein the flow of the fluid is turbulent. The chemical reactor may further include a fluid flowing through the reactor, wherein the flow of the fluid is laminar. The chemical reactor may further include a fluid flowing through the reactor, wherein the Reynolds number of the fluid flow is greater than 4000. The chemical reactor may further include a fluid flowing through the reactor, wherein the Reynolds number of the fluid flow is less than 2100. The catalytic coating may include activated carbon.

A microscale chemical reactor may include a cylindrical outer housing, with an inlet port at the outer edge of the circular base, and an outlet port at the center of, and positioned normal to, the base of the cylinder, a substrate coiled around itself to form a unidirectional, inward spiraling microchannel beginning at the inlet port and ending at the outlet port, a first heat conductive plate contacting the substrate coil positioned between the top base of the cylindrical outer housing and the top of the substrate coil, a second heat conductive plate contacting the substrate coil positioned between the lower base of the cylindrical outer housing and the bottom of the substrate coil, a catalytic coating applied to the surface of the substrate, and a plurality of spacer particles integrally applied to the surface of the substrate.

A method of refurbishing a catalytic surface of a chemical reactor may include opening an outer housing, removing a heat conductive element, removing a coiled metallic substrate; placing the coiled metallic substrate onto a first reel, rolling the metallic substrate through a first phase which sands the surface of the metallic substrate, rolling the metallic substrate through a second phase cleaning the surface of the metallic substrate, rolling the metallic substrate through a third phase depositing spacer particles onto the surface of the metallic substrate, rolling the metallic substrate through a fourth phase cleaning the surface of the metallic substrate, rolling the metallic substrate through a fifth phase depositing catalyst particles onto the surface of the metallic substrate, and rolling the treated metallic substrate into a second coil on a second real. The method may further include rolling the metallic substrate through a sixth phase annealing the surface of the metallic substrate. The fifth phase depositing catalyst particles may deposit the catalyst particles by: chemical vapor deposition, atomic layer deposition, 3D printing, or gel solvent deposition.

BRIEF DESCRIPTION OF THE DRAWINGS

FIGS. 13-15 shows the microscale reactor as incorporated into an ongoing process according to this disclosure.

DETAILED DESCRIPTION

Figure 1:
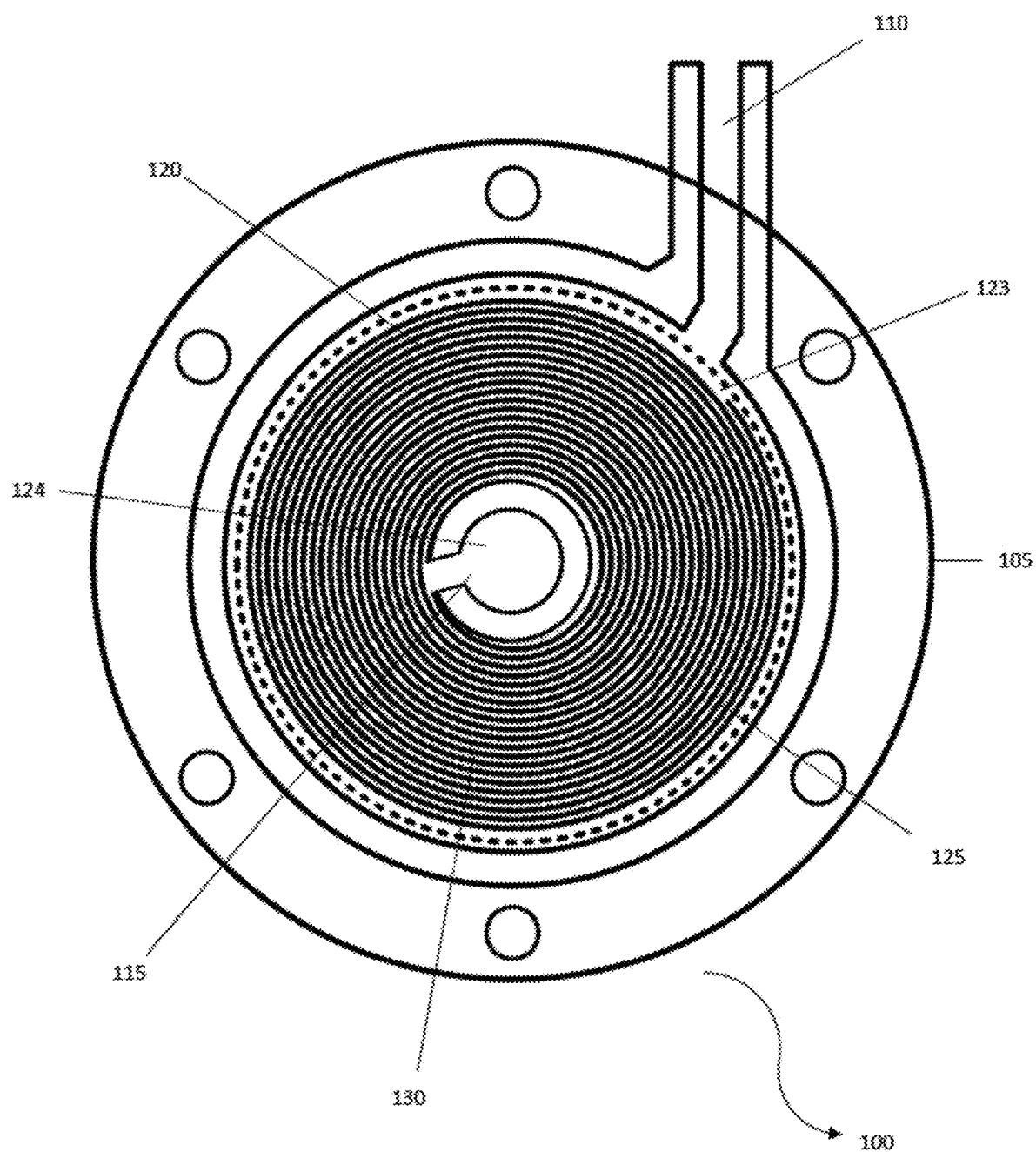
FIG. 1 shows an overhead cross section view of a microscale reactor according to this disclosure.

In many commercial chemical reactor designs, the production rate of useful products from chemical reactions is limited by the rate of mass-transfer of reactant molecules which must diffuse through product molecules and spectator molecules to contact with solid state catalyst alloy crystals. For this reason, a primary goal in design of chemical reactors employing catalysts is to maximize physical contact between reactant molecules and microscopic catalyst structures and thereby maximize both reaction rate and extent of reaction, resulting in improved product yield efficiency of the reactor.

Microscale chemical reactor design seeks to minimize mass-transfer limitations on reaction rate and speed the diffusion of reactant molecules onto catalyst surface crystals by maximizing the ratio of catalyst surface area to volume of reactants in a chemical reactor flow-cell. Microscale reactor design seeks to optimize reactant flow at microscopic scale and achieves fast diffusion of reactants to catalytic surface by keeping the flow of reactants within the fluid boundary layer which may be attached to the catalytic surface. Increasing total catalyst surface area while keeping reactant fluids within the fluid boundary layer achieves greatly reduced resistance to diffusion of reactants to catalyst surface, compared to bulk-flow fluid patterns where reactants must diffuse through the bulk-flow layer, through a fluid interphase between bulk and boundary layers, and then through the boundary layer. Ideal boundary-layer diffusion of reactants to catalyst surface allows for reduction in the amount of expensive catalyst material required relative to reaction rate. Improved reaction rate and improved extent of reaction allows for smaller reactors with lower capital cost and lower operating cost.

One industry where microscale chemical reactors can achieve commercial importance may be the production of advanced, second-generation and third-generation low-carbon biofuels. Advanced biobased diesel fuels are composed of alkane carbon chains between C10 and C18 long, which are produced from renewable raw materials composed of triglycerides and long chain fatty acids. Triglycerides and fatty acids can be obtained from plants in the form of oils produced from seeds, nuts, and beans, or from animal fats obtained from rendering of carcasses as part of food production. These triglycerides and fatty acids can be treated with hydrogen gas at elevated temperature and pressure in the presence of solid-state catalyst to produce useful fuel products which qualify as low net lifecycle greenhouse gas emission fuels which meet international fuel quality standards for on-road diesel, marine diesel, bio-jet turbine fuel, middle-grade gasoline fraction fuels, two-stroke engine fuel, and low-carbon, butane range gas phase fuels for use as cooking gas or for power generation.

Chemical reactions which employ hydrogen, triglycerides, long chain fatty acids, and pyrolysis bio-oils, as primary reactants, and which occur in a chemical reactor flow-cell employing solid-state catalyst to produce hydrocarbon fuels are collectively termed as "hydrotreating" reactions. Production of commercially viable biofuels, which meet fuel quality specifications, may include a deoxygenation reaction whereby hydrogen reacts with oxygen atoms to form water. Oxygen atoms are naturally incorporated into the molecules of crude biobased raw material. For example, biofuel refining typically requires that the oxygen ester portion of long chain vegetable fatty acid molecules and animal fat triglycerides react with hydrogen to form water byproduct, which may then be separated from hydrocarbon fuel products. From a fuel quality regulatory perspective, on-specification bio-based motor fuel may be produced in a chemical reaction and purification process which includes removal of oxygen from organic feedstock molecules. Deoxygenation may be the defining chemical reaction in production of on-specification, on-road, renewable, bio-based diesel fuel.

Hydrotreated vegetable oil and hydrotreated animal fat, with deoxygenation typically meets international fuel quality specifications for use as diesel motor fuel and is described as premium quality second-generation renewable diesel fuel. Bio-based diesel fuel produced from cellulosic raw materials such as agricultural residue, forestry slash, dead trees from drought or insect infestation, or produced from waste oils and sewerage deposits of fat, oil, and grease are described as advanced third-generation renewable diesel fuel. When hydrogen reactant is obtained from renewable low-carbon sources then fuels derived from hydrotreating of bio-based raw materials can achieve net-zero lifecycle carbon dioxide emissions to the atmosphere. Consumption of second generation and third generation renewable biofuels for use as motor fuel greatly reduces the climate change impact of greenhouse gas emissions relative to consumption of traditional petroleum fossil fuel because they typically meet fuel quality specifications at 100% concentration, thereby making the maximum contribution to greenhouse gas reduction and energy security objectives. Whereas first generation biofuels are methyl-ester biodiesel and ethanol, both of which may only be suitable as additives at low blend ratio into petroleum fossil fuels.

Microscale reactors with their compact size and fast reaction rate typically have the advantage of being able to economically scale-down and meet lower production rate requirements on community-scale biofuel projects around the world. Remote small-scale production of coconut and palm, plus village enterprises rendering animal fat do not receive the best price for their products. Rural farmers often pay excessive prices for unreliable deliveries of imported diesel fuel. Economic, environmental, and social benefit impacts may be numerous from cost-effective hydrotreating reactors for production of renewable low-carbon marine diesel fuel, #2 grade on-road diesel fuel, and aviation grade bio-jet fuel derived from bio-based vegetable oil and animal fat. Production and consumption of low net $CO_2$ emission, renewable diesel serves international economic development goals for rural communities globally. In village enterprises around the world, vertically integrated production of raw material crops and food co-products, which is integrated with production of low-carbon transportation sector biofuels, delivers increased family income and spreads capital cost, operational costs, and risk across more sources of revenue. Community scale hydrotreating technology may serve the need for reliable energy supply among isolated and economically developing communities in the tropics with abundant bio-based raw materials and who may be entirely dependent on expensive and unreliable imports of greenhouse gas polluting fossil fuels. Sustainable economic development accompanied by low greenhouse gas emissions are a mainstay of the United Nations Millennium Development Goals for energy security and human resource development. Scaled-down production of renewable diesel via small scale hydrotreating technology solves a long-standing obstacle to community-scale production of renewable diesel and may revolutionize the biofuel industry.

Recent prior art related to manufacturing methods for microscale chemical reactors involves fabricating planar catalytic plate surfaces which are fitted closely together in opposing orientation, to form planar microchannels with reactants flowing along the surface of both catalytic plates. Prior art describes catalyst plates which are produced individually and are short with respect to the fluid-path length, due to use of established batch fabrication methods from the semi-conductor industry in which each silicon wafer surface is processed individually through a series of micro-fabrication steps.

In recent prior-art, semi-conductor industry batch fabrication methods for microscale catalytic surface plates leads to reactant fluid-path length of 12 inches or less, the diameter of a silicon wafer. Short fluid path length leads to a requirement for ideal diffusion rate, fast reaction rate, and short residence time of reactants in the catalytic flow cell. To achieve very fast reaction rate, prior art requires catalyst surfaces which are mounted perfectly co-planar, to keep the flow of liquid reactants within the boundary layer of each catalyst surface. Perfect co-planar mounting of catalyst plates is also required to keep plates from touching and closing the fluid path. Recent prior art describes an overall reactor flow-cell fabrication process which is expensive and difficult to perform because of difficulty in mounting the individual catalyst catalytic surface plates within a backing sandwich style enclosure. The requirement to maintain perfect co-planar orientation of the catalyst surface plates leads to a high defect rate in production of hydrotreating reactor flow cells Recent prior is characterized by expensive batch fabrication methods to produce solid-state catalyst reactors, including batch micro-machining of catalyst plate surface texture, and batch solid-state catalyst deposition methods. Economies of scale type reduction in production cost do not apply to expensive batch one-at-a-time manufacturing of planar catalytic surfaces. Economies of scale do not apply to batch fabrication methods for complete catalytic flow cells and reactor assemblies.

Technical and commercial success for microscale chemical reactors used in production of advanced biofuels may depend on achieving economies of scale for catalytic surface production, where the cost of production of catalytic surface area drops as a function of increasing catalytic surface area production. Economies of scale for production of complete catalytic reaction flow cell assemblies may be a requirement for microscale chemical reactors to contribute to reduction in capital cost for biofuel plants producing second-generation and advanced third-generation biofuels. Prior art describes microscale reactor production processes which are expensive and unprofitable, thereby preventing highly efficient microscale chemical reactor designs from taking their place in the mainstream of industrial practice on chemical reactors.

Very large-scale packed bed hydrotreating reactors employing solid-state catalyst are a standard unit-operation in petroleum refining operations for cracking and hydrodesulfurization of crude petroleum. The adoption of microscale reactors employing solid-state catalyst can overcome an inherent problem with existing commercial packed-bed catalyst systems which are inherently inefficient on heat transfer. Both biofuel industry and petroleum industry packed bed hydrotreating reactors suffer from declining catalyst activity because of the formation of soft coke deposits on catalyst crystal surfaces. Limited capacity for removal of exothermic heat-of-reaction in packed-bed reactors results in excess temperature build-up at the catalytic surface, requiring replacement of the precious metal catalyst.

Established packed-bed hydrotreating reactors for production of second-generation and advanced third-generation biofuel suffer from high capital cost, high material cost, high maintenance cost, and significant downtime due to fouling of catalytic surfaces with deposits of soft-coke on the surface of packed-bed catalyst material. Formation of baked-on soft coke results from limited surface area for heat-removal flux, leading to excessive temperature at the granular catalyst surface in packed-bed catalyst reactors.

Deactivation of solid-state metal alloy catalyst particles may be avoided by elimination of excessive temperature buildup at the catalytic surface which leads to the formation of soft-coke deposits. Current second generation and third generation biofuel production projects be rendered economically non-viable due to significant costs related to declining catalyst performance, reactor downtime, and replacement of catalytic packing material. Once catalyst granules are deactivated, it is very costly to the biofuel producer to empty and reload the packed bed reactor. Significant formation of soft coke requires biofuel production workers to enter the hazardous confined-space of very large packed bed reactor towers to manually remove coke formations which have baked-on to reactor tower interior surfaces. Packed-bed type ceramic catalyst structures and granules which have been fouled with coke deposits typically are refurbished and recoated with metal alloy catalyst particles however their utility and value decline significantly after first use.

Catalyst material cost and reactor maintenance cost may be the second highest cost category for production of advanced third generation renewable diesel fuel, after the cost of raw material biomass and agricultural residue. Savings are needed in the cost of solid-state catalyst systems if advanced second generation and third generation biofuels can make a significant contribution to reduction in greenhouse gas emissions and promotion of energy security for communities with abundant bio-based raw materials and who suffer from expensive and unreliable petroleum imports.

In some embodiments, a microscale reactor design employs a long run of flexible stainless-steel roll stock which serves as catalytic surface substrate. Depending on thickness, the roll stock may be termed foil, ribbon stock, or sheet stock. Preferred temperature for hydrotreating reactions may be at least 300 degrees Celsius above ambient temperature. At elevated temperature thermal expansion of the stainless-steel substrate occurs, causing elongation of the material in all directions with increase proportional to cold-length of the stainless steel substrate. Therefore, thermal expansion may be greatest along the long dimension the steel ribbon. The spiral ribbon catalytic surface may be confined within a round enclosure with first confining round barrier in the form of a slotted wall. The wall functions as an enclosure for the spiral-wound catalytic substrate. Many slots may be provided around the barrier solid wall for escape of product fluids as the final position of the spiral flow cell exit point may not be known exactly due to variation on operating temperature of the hydrotreating reactor. The slotted wall enclosure allows for liquid and gas products to exit the spiral reactor flow cell where reaction product fluids may be collected and routed to exit the pressure vessel enclosure.

At the center of the hydrotreating reactor catalytic flow cell, which may be made from stainless-steel roll stock, may be a gas-liquid distribution header. The header serves to distribute finely divided bubbles of hydrogen gas through the liquid phase vegetable oil or animal fat. Diffusion and reaction of hydrogen gas with raw material oils may be enhanced as fine bubbles of hydrogen gas may be carried into the catalytic reactor flow cell. Metal foam may be a beneficial material for fabrication of the gas-liquid distribution header because hydrogen gas bubbles may be finely divided. The metal foam header can serve as an electrical resistance heater, to promote reaction conditions on temperature in the fluid reactant stream.

The header assembly may be mounted perpendicular to the plane of the gas-liquid catalytic flow cell spiral and passes into the center of the spiral along the axis of the spiral. Sintered porous metal foam may be used as material for fabrication of the reactor flow cell header. Metal foam may be used to enhance formation of micro-fine bubbles of hydrogen gas as they enter the reactor liquid phase flow of raw material bio-oil. Mass transfer of hydrogen gas, diffusing through the vegetable oil, readily reaches catalyst particles and achieves fast reaction rates.

Reactant fluids include hot vegetable oil liquid and a separate stream of hydrogen gas. The two phases merge and enter the reactor flow cell as ma well-mixed stream with finely divided gas bubbles. The header fixes the spiral at the center end. The long tail end may be free to travel around the circular housing, as the length of ribbon changes with temperature.

Methods of catalyst alloy particle deposition onto the stainless-steel roll stock are well-known from the art of making granular catalyst particles and catalyst coated ceramic packing materials for packed bed reactors. Catalyst deposition methods are common in production of catalytic converters as part of automobile exhaust assemblies. Common methods of catalyst deposition include methods used in microelectronics manufacturing including chemical vapor deposition and sputter. 3D printing techniques may be well suited to deposition of catalyst alloy particles onto the stainless-steel roll stock substrate. The sol-gel process for catalyst deposition may be a commonly used wet chemical process for creation of stable thin-films, and which includes chemical solution deposition, catalyst condensation, drying, and crystallization of catalyst alloy particles, followed by sintering and catalyst alloy particle grain growth.

Figure 2:
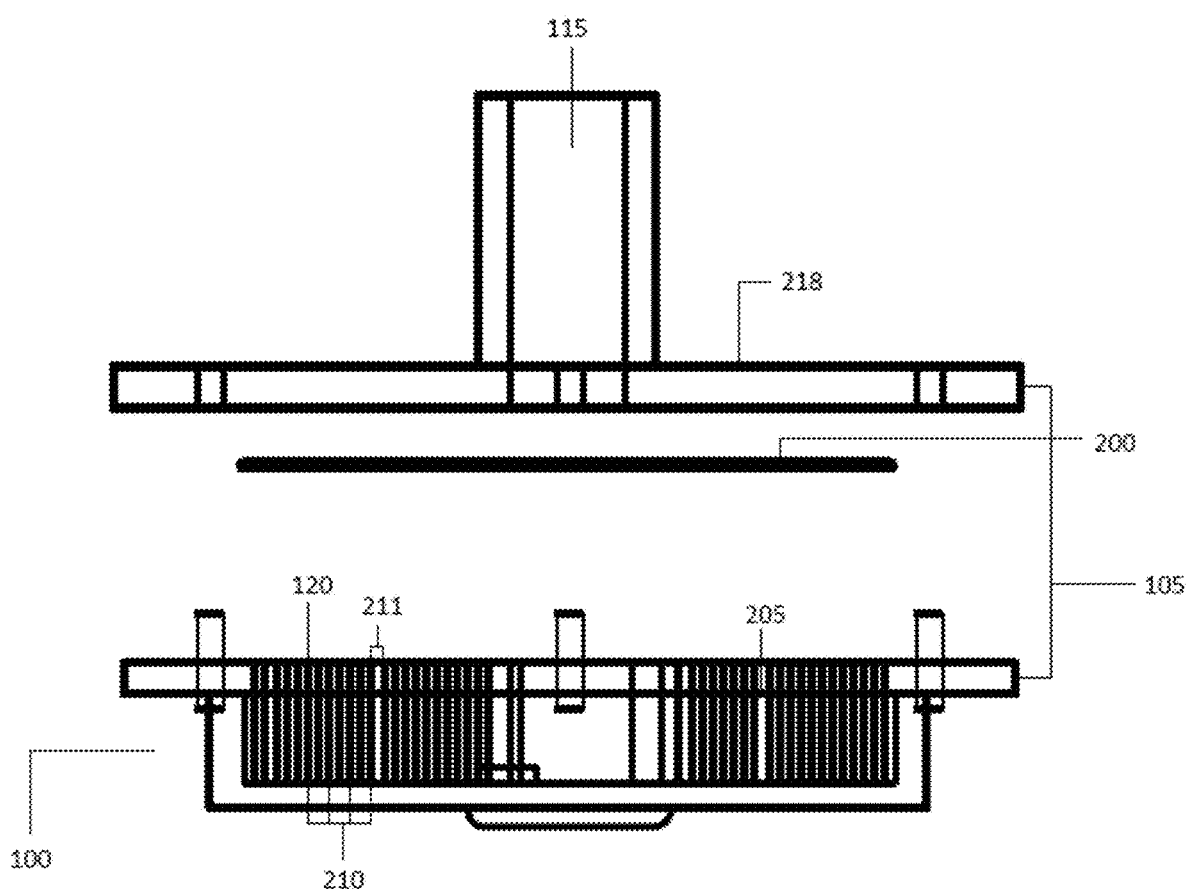
FIG. 2 shows an orthogonal cross section of the microscale reactor according to this disclosure.

In a present embodiment, illustrated by FIGS. 1 and 2, a microscale reactor 100, has a catalytic substrate 120, wound in in a spiral shape 130, to create a plurality of parallel catalyst surfaces 210, which confine the fluid in a flow-cell directing reactant fluid along a spiral flow path 125, which runs parallel to the catalytic surface area. An individual section of the spiral flow path 125 falls within a very narrow gap between the parallel catalyst surfaces and creates a microchannel 205. The catalyst substrate 120 may be a substrate which has been treated with catalyst crystals. The reactor has a first port 110 which begins at the edge of the spiral follow path 123, and a second part 115 which ends at the center of the spiral flow path 124. The long, narrow spiral path creates a large catalyst surface area which the reactants continuously contact while traveling from the edge of the spiral follow path 123 to the center of the spiral flow path 124. The flow of the reactor may also be reversed with the reactants flowing from the second port 115 at the center of the spiral flow path 124, to the first port 110 at the edge of the spiral flow path 123. This microscale reactor design allows for long residence time inside the flow cell, high catalyst surface area, and a compact reactor design, which maximizes single pass reactant conversion.

Figure 3:
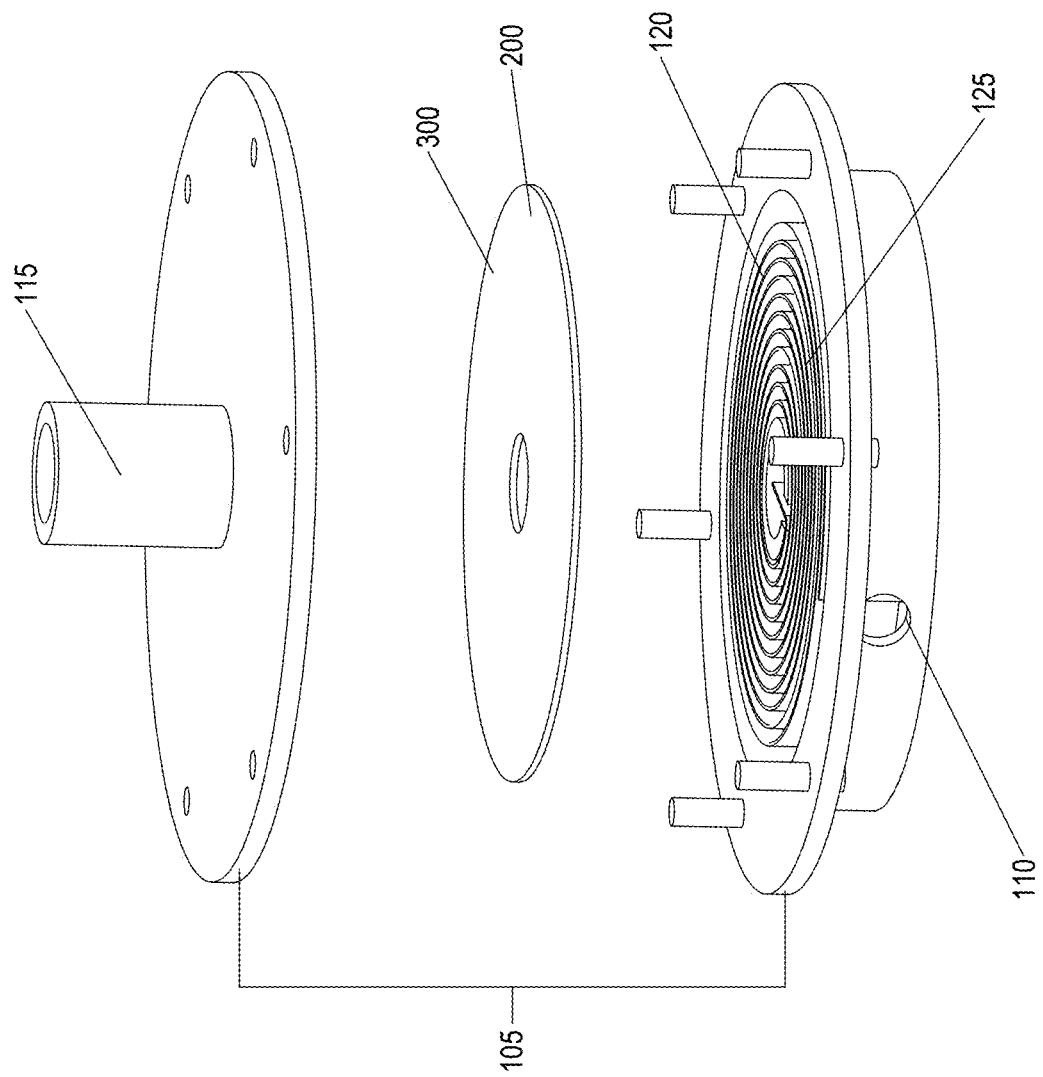
FIG. 3 shows a downward diagonal view of a shaded reactor microscale reactor assembly according to this disclosure.
Figure 7:
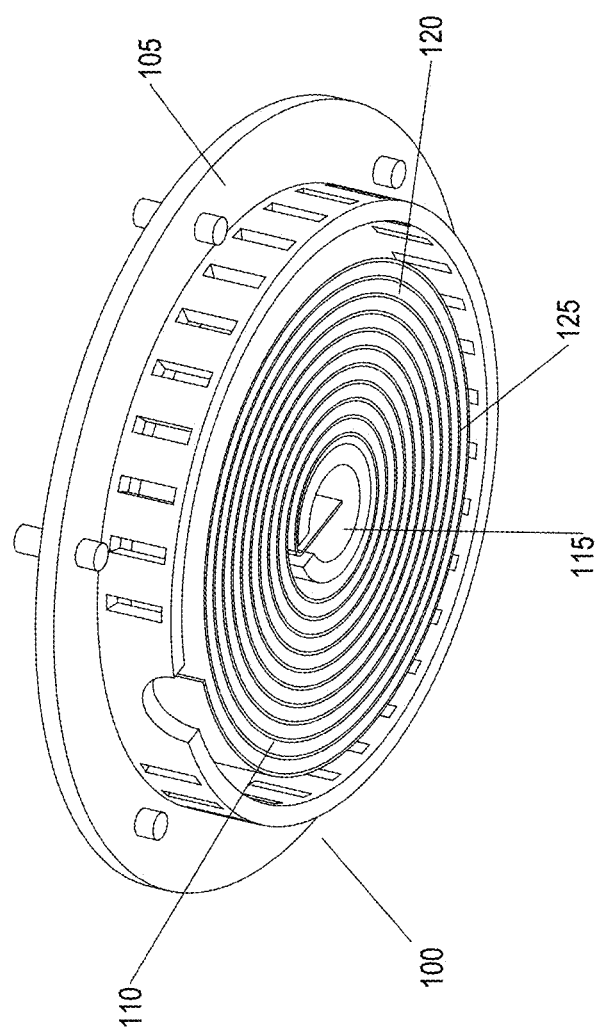
FIG. 7 shows an upward diagonal view of a shaded reactor microscale reactor assembly.

As illustrated by FIGS. 2, 3, and 7, the reactor may also have a heat conductive element 200 positioned between the outer housing 105 of the reactor and the spiral wound substrate 130, where the heat conductive element 200 may be positioned normal to the parallel catalyst surfaces 210. As is illustrated by FIG. 3, The positioning of the heat conductive element 200 provides a large heat transfer surface area 300 between the heat conductive element 200 and the catalyst treated substrate 120, maximizing heat transfer to or from the reactor. In one embodiment, the microscale reactor may be small, and the total width of the catalyst treated substrate 120 may be only a few inches, a short enough distance to effectively facilitate heat transfer from the entire width of the catalyst treated substrate 120 to the heat conductive element 200, without the need for additional heat transfer mechanisms, due to the high thermal conductivity of the metal substrate. There optionally may be a heating element or a cooling element contacting the outer housing of the reactor 105 which may be in contact with the heat conductive element 200 to provide the necessary heat flows for either endothermic or exothermic reactions. There optionally may also be a second heat conductive element positioned on the opposite side of the reactor from where the first heat conduct element may be positioned to further promote heat transfer by directing heat flux on both sides of the reactor.

A notable advantage of microscale reactor architecture may be optimum chemical process control of temperature as a result of large heat-transfer surface area which facilitates removal of exothermic heat of reaction. Alternatively, it could be used to supply heat to an endothermic reaction.

In a present embodiment, the catalyst treated substrate 120 serves as a heat transfer surface conducting heat away from the exothermic reaction, which then transfers the heat to the heat conductive element 200 and out of the system. Effective heat transfer from the catalytic surface may be particularly important in hydrotreating reactions because deoxygenation reactions are highly exothermic.

A present embodiment may be a continuous process to combine two or more locally-planar catalytic surface ribbons into a parallel stacked configuration to thereby produce linear microscale reactor flow cells 210. The continuous linear catalytic flow cell with a long spiral flow path 125 and large catalytic surface area made up by the spiral wound catalyst substrate 120 serves to promote high overall heat transfer rate to remove exothermic heat of reaction via heat flux occurring over a large surface area. Here the catalyst substrate 120 may be the large surface area. Efficient heat transfer solves the problem of formation of deposits of soft-coke which otherwise bake onto catalyst surface. Excess temperature due to exothermic reactions result in formation of soft-coke coating over the active catalyst crystal particles, resulting in deactivation of the catalyst right at the wetted catalytic surface. High overall heat transfer rate delivers the advantage of improved chemical process control on temperature, which allows for hydrotreating reactions to be more selective, resulting in less side chain reactions and a greater yield of target product molecules.

In another embodiment, a second spiral flow path running parallel to the first spiral flow path may be present. A heating or cooling fluid may run through the second spiral flow and serve as an alternative heat transfer mechanism to either heat or cool the reaction. The heat transfer fluid could run in either a concurrent or counter current direction. This embodiment may be desirable when large reactors are built such that the width of the heat transfer surface area may be several feet long, and heat would not effectively be moved from the center of the catalyst treated substrate to the ends of the reactor where the heat conductive elements may be located.

Figure 4:
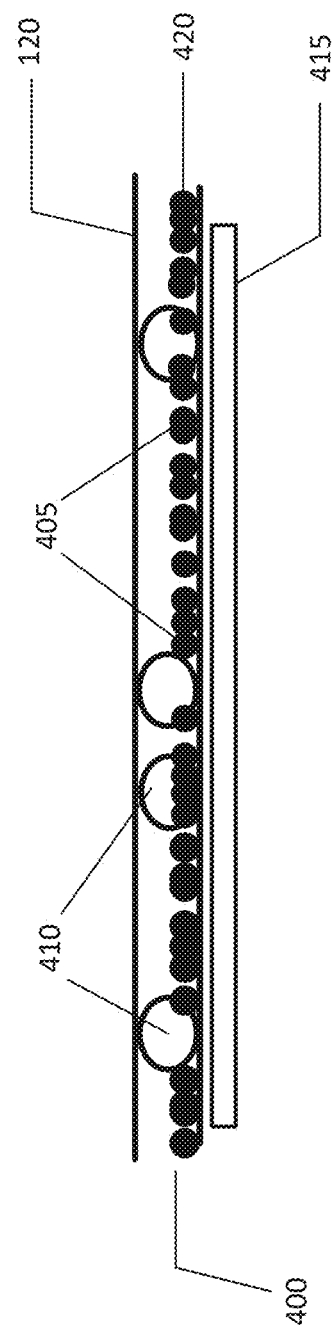
FIG. 4 shows an illustration of a treated catalyst substrate according to this disclosure.
Figure 5:
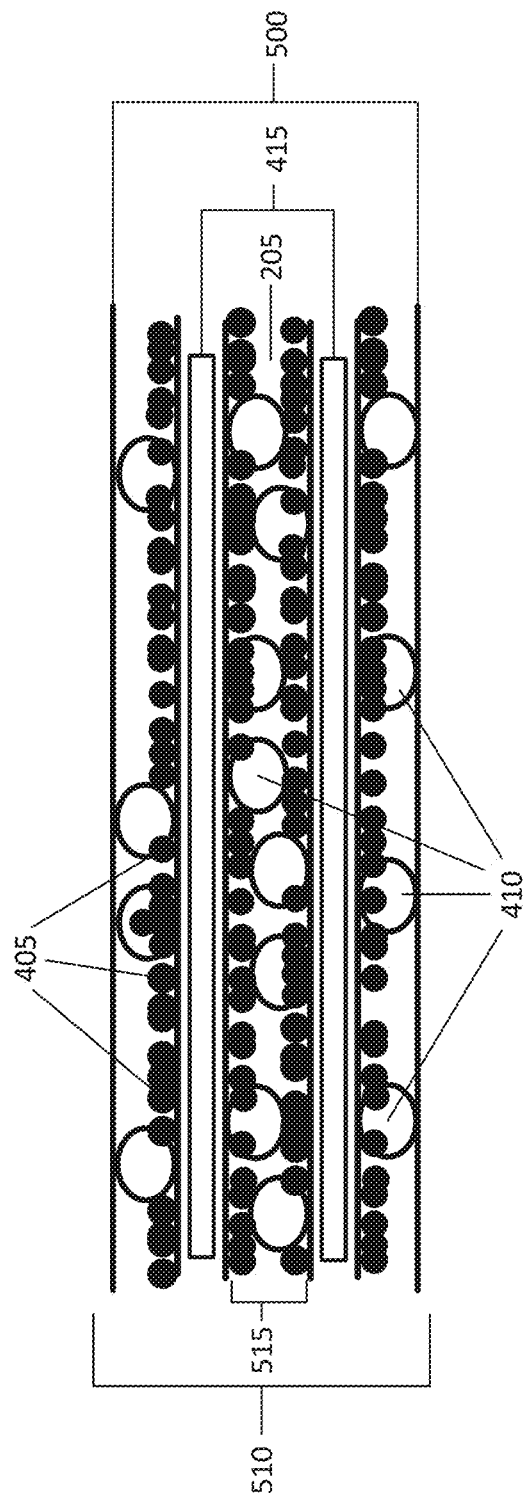
FIG. 5 shows an illustration of a double-sided layered catalyst substrate according to this disclosure.
Figure 6:
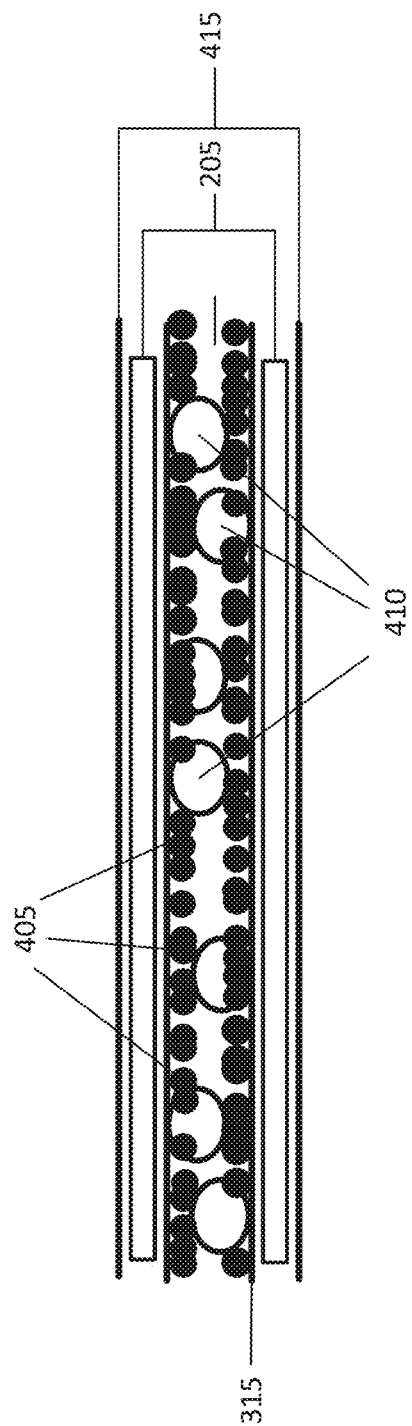
FIG. 6 shows an illustration of a microchannel created between layers of the treated catalyst substrate according to this disclosure.

Some embodiments of the catalyst treated substrate are illustrated in FIGS. 4-6. The catalyst treated substrate comprises a metallic ribbon 415 as the base material upon which the compound coating 400 may be placed. The compound coating 400 contains the catalyst, a binder layer 420, catalyst crystals 405, and spacer particles 410. The metallic ribbon 415 may be stainless steel or a stainless-steel alloy. The binder layer 420 may serve to bind the catalyst crystals 405 and the spacer particles 410 with the metallic ribbon 415, to form the final catalyst treated substrate 120. The catalyst may be chosen from a variety of different materials including: Pt, Pd, Ag, Au, Ni, Mo, a Ni—Pd alloy, a Ni—Mo alloy, an alkaline earth metal, an alkaline earth metal oxide, or a carbon catalyst. The spacer particles 410 may be microspheres, and may be aluminum oxide microspheres. The spacer particles may serve an important function in the above described embodiment of a microscale reactor 100 as they allow for the catalyst treated substrate 120 ribbon to be wound around itself into a spiral shape 130 without risk of closing the spiral flow path 125, because the spacers may prevent the faces of the catalyst treated substrate 120 from fully coming into contact with each other. This greatly simplifies the production of the reactor and greatly reduces the cost of production.

Additional embodiments of the catalyst treated substrate in FIGS. 5-6 show that both sides of the metallic ribbon 415 may be treated with the catalyst crystals 405, spacer particles 410, and binder layer 420, so that both sides of the ribbon can be used as the parallel catalytic surfaces 210 in the reactor, creating a microchannel 205 on each side of the catalyst treated substrate 120, maximizing catalyst surface area, thereby increasing the efficiency of the reactor. FIG. 5 at 500 shows a cover sheet which may be placed on the outer edge of the catalyst treated substrate 120. FIG. 6. shows a microchannel 205 in which reactants flow, in between the parallel catalytic surfaces 210.

Figure 16:
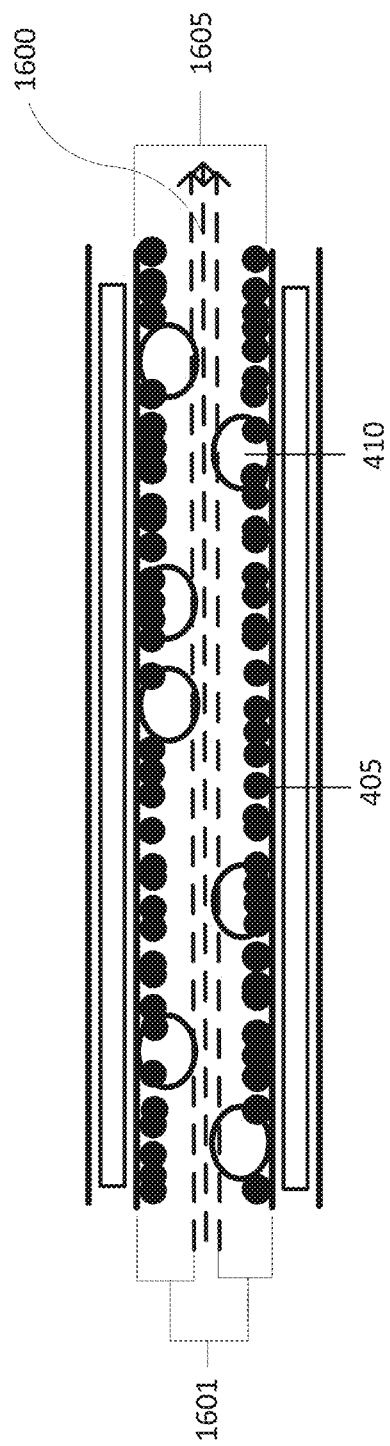
FIG. 16 shows an embodiment of the microscale reactor in the laminar flow regime according to this disclosure.
Figure 17:
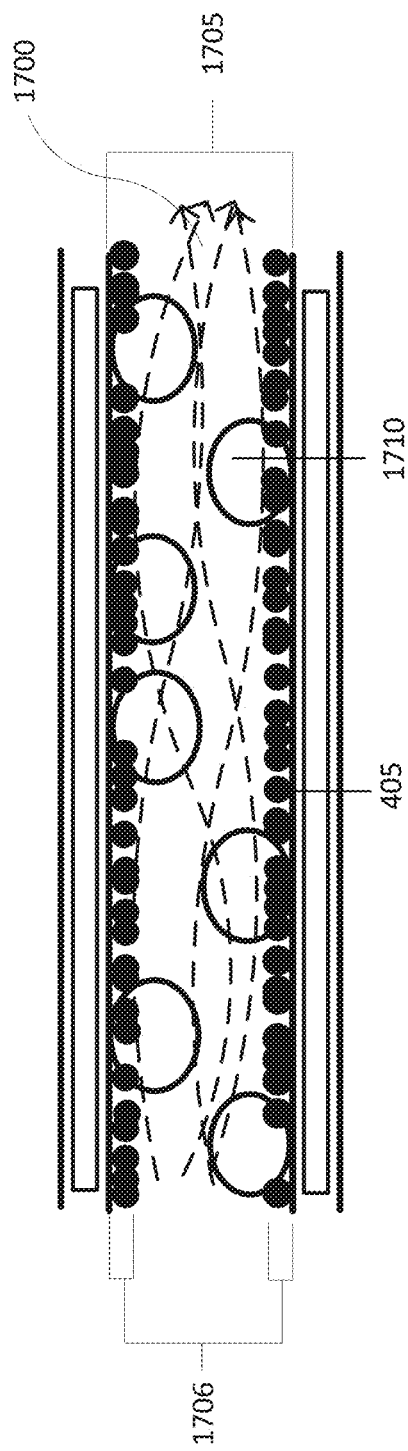
FIG. 17 shows an embodiment of the microscale reactor in the turbulent flow regime according to this disclosure.

The microscale reactor can be operated in a number of different embodiments. FIGS. 16 and 17 shows the illustrations of the reactor microchannels as operated in laminar and turbulent flow. In one embodiment, the majority of reactant fluid flow 1110/1125 running parallel along the spiral path 125 to the locally planar catalytic surface 210 may be within the boundary layer and the flow can be described as laminar 1600. Laminar boundary layer flow is characteristic of fluids which run along a solid surface at low velocities. Flow of reactant liquid and hydrogen gas which may be within the boundary layer promotes reduced resistance to diffusion of hydrogen gas through the liquid phase boundary layer, down to the catalytic surface, compared to fluid flow within a free-stream bulk flow above the boundary layer. Boundary layer flow and resultant reduced resistance to diffusion of reactants to the catalytic surface promotes fast reaction rate, allowing for reduced residence time in the reactor flow-cell and smaller overall reactor size.

In microscale reactors, increased extent of reaction and increased rate of reaction may occur, even in a laminar flow regime where most of the reactant flow may be passing within the boundary layer, due to the high catalyst surface area contacting the boundary layer. Optimum reactant fluid contact with catalyst may be maintained by close spacing of the parallel catalyst surfaces 211, resulting in high fluid volume with boundary layer laminar-flow characteristics in contact with solid-state catalyst surface. Another advantage of reactor architecture employing parallel catalyst surfaces 210 along the fluid path 125 may be that reactant fluid is not impeded along its passage through the flow-cell, resulting in greatly reduced frictional losses in the flow cell. An advantage of operating the reactor in the laminar flow regime may also include reduced frictional losses, reduced pressure drop, and reduced pumping work, which allows for even small pumps using limited amounts of electric power to operate the reactor flow cell.

Boundary layer flow conditions may be not disturbed by catalytic surface which may curve to any shape at the macro-level. It may only be necessary for reactant fluids to pass along a continuous catalytic surface which may be locally planar within microscale distance along the Z axis relative to a length of linear catalyst along the X axis of about 1 centimeter.

In another embodiment, the reactor fluid may operate at high fluid velocity. In this embodiment, fluid flow through the reactor would be turbulent 1700, and the boundary layer thickness would diminish 1706. Turbulent flow promotes mixing of fluids in the free-stream bulk flow regime down into the boundary layer. Increased diffusion promotes fast overall chemical reaction rate. A performance advantage of a portion of the reactants passing with turbulent free-stream bulk flow characteristics may be that gas phase voids in the fluid flow may be broken up into smaller voids and re-mixed into the liquid flow, resulting in increased mass transfer of hydrogen gas into the liquid phase flow, and increased diffusion of hydrogen gas into the boundary layer. Turbulent mixing also increases heat transfer from fluids to the catalyst backing material and thereby transfer exothermic heat of reaction out of the reaction zone.

For solid state chemical reactors to work, the solid catalyst typically must be wetted by the boundary layer liquid phase reactants. Breaking up of gas phase voids may solve the problem of solid-state catalyst which may not be continuously wetted by reactants. Fast overall reaction rates may be promoted by turbulent mixing of reactant fluids within the free-stream bulk flow regime. Turbulent flow in the bulk flow regime increases the mass transfer rate, may increase overall reaction rate, and reduces the required residence time of reactant fluids in the reactor flow-cell to achieve the chemical reaction engineering design goals. Turbulent flow in the free-stream bulk flow layer may especially increase the reaction rate of mass transfer limited reactions. The impact of optimized reaction rate may be the small reactor volume relative to reactor product output. Microscale reactors achieve superior extent of reaction on use of compact equipment whereas much larger equipment designs are needed when employing industry-standard packed-bed catalyst for solid-state catalyzed reactions. The increased heat transfer resulting from turbulent flow may also be useful in optimizing the reactor.

Each of the disclosed embodiments may be improvements over prior art because the inventive principles enable flexible reactor geometry and flexible operating conditions of microscale reactors. The outer housing 105 of the reactor need not be cylindrical but could be any shape suitable for containing the catalytic flow cell shown in FIG. 6. Reactor geometry may be entirely linear and may be not restricted to the spiral flow path 125. The disclosed embodiments may be applicable to varying reactor geometry, varying flow rates, varying heat flows, and varying reactant raw-materials. The disclosed embodiments for novel manufacturing methods to produce microscale reactors reduce the cost of production of microscale reactors by capturing improved economies of scale on production of catalytic surface and may combine with reduced production cost for complete reactor assemblies with large catalytic surface area, characteristic of the spiral configuration 130.

A present embodiment makes use of the previous embodiments to produce a bio-reactor, suitable for liquid phase biological reaction processes and gas-liquid contacting type biological processes. Examples include anaerobic digestion of organic contaminates in wastewater, reduction of odor compounds in a biogas stream by diffusion of odor molecules into a wetted biofilm, and microbial fermentation to produce useful compounds. In such an embodiment, a bio-film coating may be deposited on the parallel flow-cell surfaces. Bio-film can be made of microscopic bacteria which serve to perform chemical reactions on gas or liquid fluid-phase biological materials passing through the microscale flow-cell. An example of a bio-film is the accumulation on teeth between brushing. In this embodiment, a bio-reactor flow cell which was produced in a continuous process with great bio-film surface area relative to small fluid volume solves important problems in industrial biological and wastewater treatment processes. Processing in a bio-reactor with large bio-film surface relative to small fluid volume achieves high completion of reaction. The result may be greater removal of biological contaminates in water and greater product yield on biological reactions, including fermentation. A biofilm may also comprise an enzyme.

In another embodiment, the metallic substrate may be coated with activated carbon in solid phase and used to remove impurities from a gas phase or liquid phase fluid stream. In particular, activated carbon, can be used to remove hydrogen sulfide gas from a gas phase biogas stream exiting from an anaerobic digester. In another embodiment, activated carbon may be doped with potassium permanganate to oxidize difficult to treat odor compounds di-hydrogen disulfide and methyl mercaptans. In another embodiment, activated carbon coating on the microscale flow cell can be used to absorb sulfur compounds from liquid phase wastewater before anaerobic bacteria convert sulfur to hydrogen sulfide gas in an anaerobic digester.

In one embodiment, triglycerides and long chain fatty acids contained in crude bio-oil may be treated with hydrogen gas at elevated temperature and pressure in the presence of solid-state catalyst, in the above described chemical reactor, notable for its low fluid volume relative to large catalyst surface area.

Figure 11:
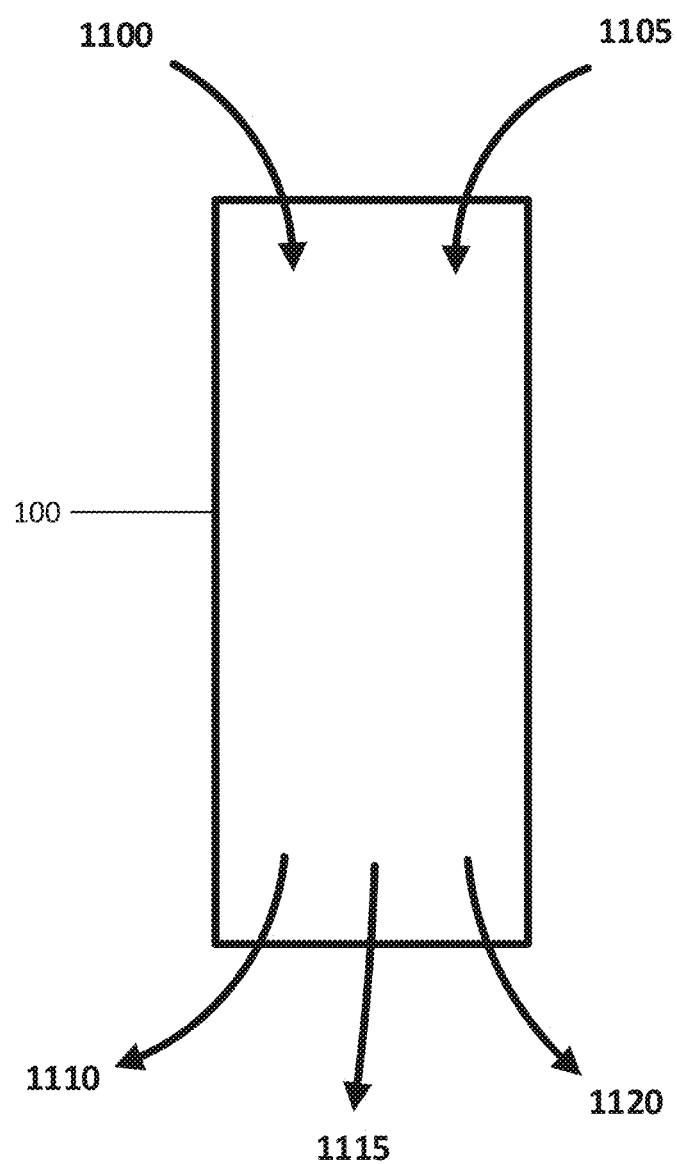
FIG. 11 shows mass flow through a microscale reactor according to this disclosure.
Figure 12:
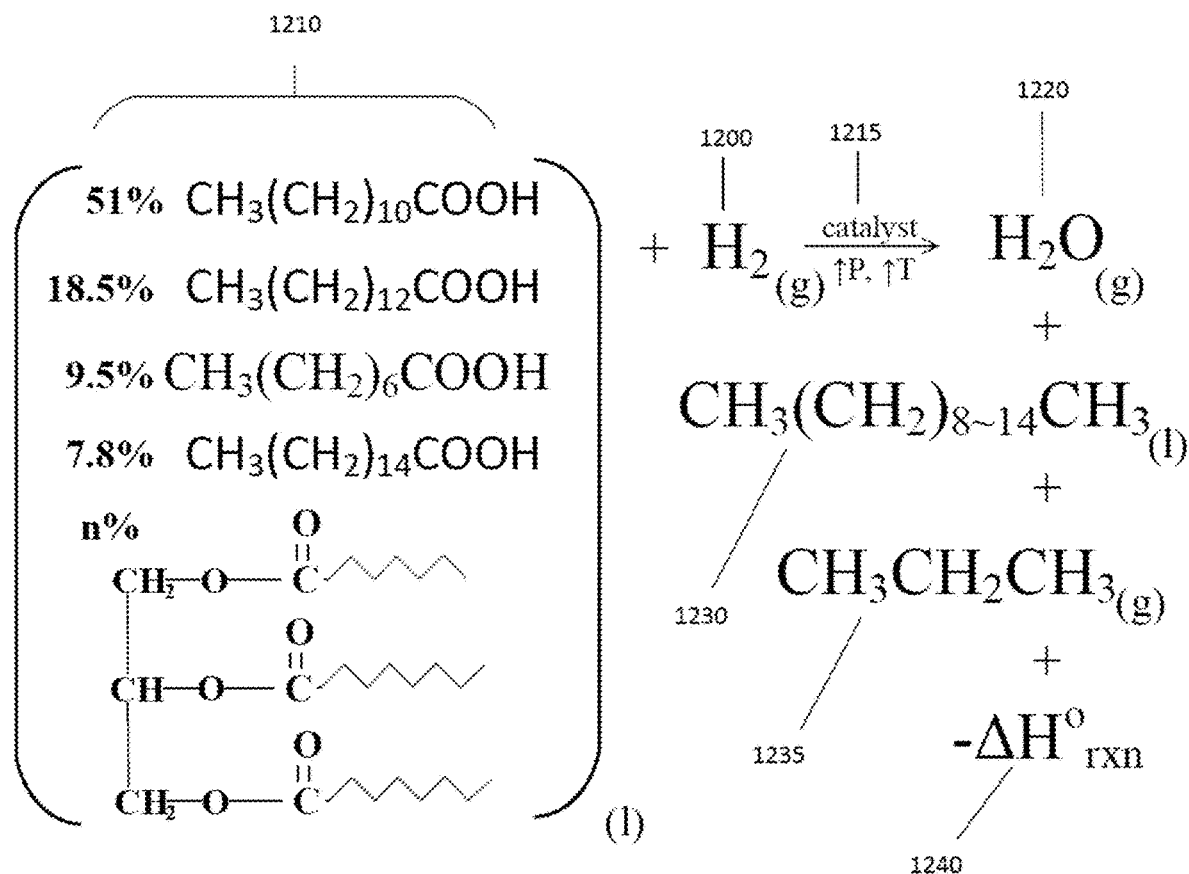
FIG. 12 shows a hydrotreating and deoxygenation reactions which occur in the microscale reactor according to this disclosure.

The reaction of said embodiment may be shown in FIG. 12, and a sample reactor with flow streams may be shown in FIG. 11. The reactant input fluids may be a mixture of combined gas phase 1105 and liquid phase 1100 fluid flows consisting of hydrogen reactant in the gas phase 1200 and bio-oils in the liquid phase 1210. The reactor output fluids may be a mixture of combine gas phase 1110/1125 and liquid phase products 1115/1120 including propane product in the gas phase 1235, unreacted reactant bio-oils in liquid phase 1245, renewable diesel product in liquid phase 1230, and byproduct water in the vapor phase 1220.

Water byproduct from the deoxygenation reaction can be separated from the products of the hydrotreating reactor by density separation, by distillation, or by absorption through hydrophilic material in a packed bed.

Figure 15:
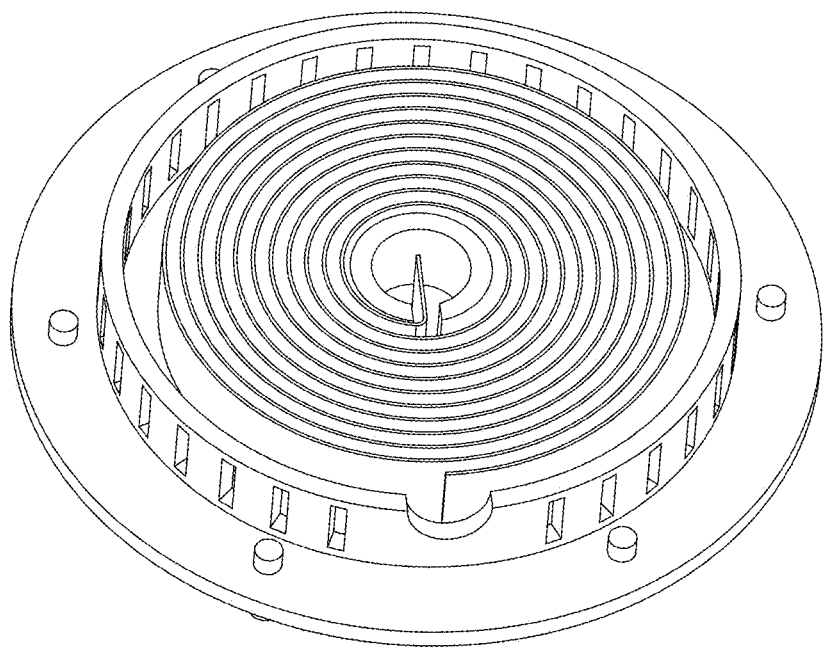

For hydrotreating reactions to occur, molecules of liquid phase bio-oil reactant 1210, and dissolved gas phase hydrogen molecule reactant 1200, must both touch a solid-state catalyst metal crystal 410 within one diameter 1500 of the 3-molecule reacting complex 1505, as illustrated by FIG. 15. The present embodiment may be a microscale reactor optimized to ensure fast diffusion of reactants to the catalytic surface within atomic distance scales. This may be accomplished by the microscale reactor through the presence of the microchannel 205 and high catalyst surface relative to fluid volume, and which may be achieved through the spiral flow path 125.

Figure 8:
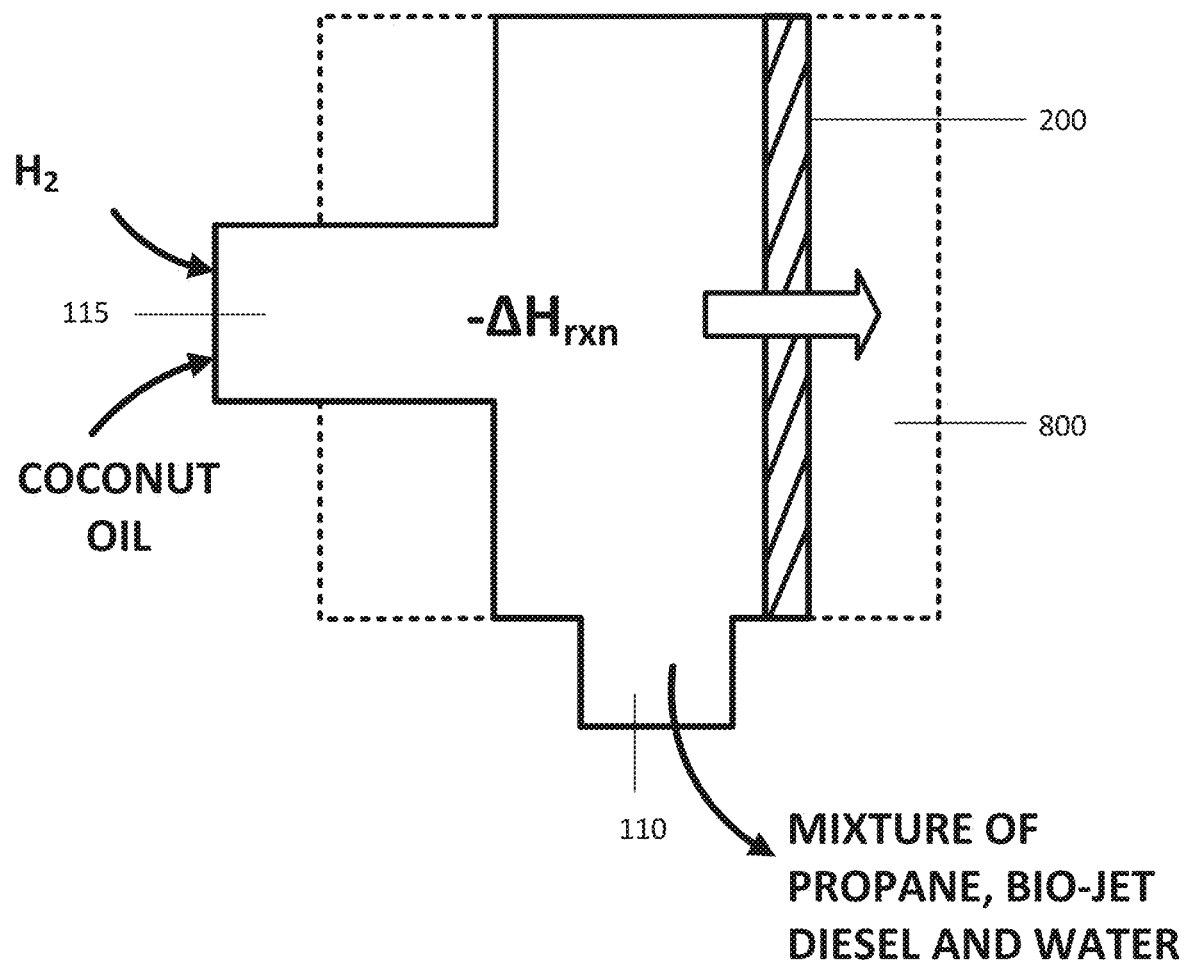
FIG. 8 shows heat flow in an embodiment of the reaction according to this disclosure.

Hydrotreatment of fatty acids and triglycerides to produce alkanes, as in the reactions of FIG. 12, are highly exothermic, and produce a high enthalpy of reaction 1240. In order to maintain optimal reaction conditions, and to prevent premature catalyst fouling it may be imperative that heat be transferred away from the catalytic surface where the reaction is occurring. As illustrated by FIG. 8, the heat transfer element 200 and heat sink 800 in the disclosed microscale reactor design may be optimal for removing heat from such reactions. Additionally, the heat transfer element may be in contact with a heating element to pre-heat catalytic surface during startup of hydrotreating reactions.

Because of the predominance of low molecular weight fatty acids (predominantly C8-C14 carbon chain) in coconut oil 1210, a very desirable fraction of C8 through C14 alkanes 1230 may be sold as blend-stock for renewable bio-jet fuel 1115. Because of its added value as a source of bio-jet fuel, coconut oil may be chosen to illustrate the process. Other suitable feedstocks for conversion of triglycerides and fatty acids into Hydrotreated Vegetable Oil include palm oil, palm kernel oil, jatropha oil, pongamia oil, castor oil, and animal fat, which may be abundant resources in parts of the world with limited petroleum resources.

Figure 13:
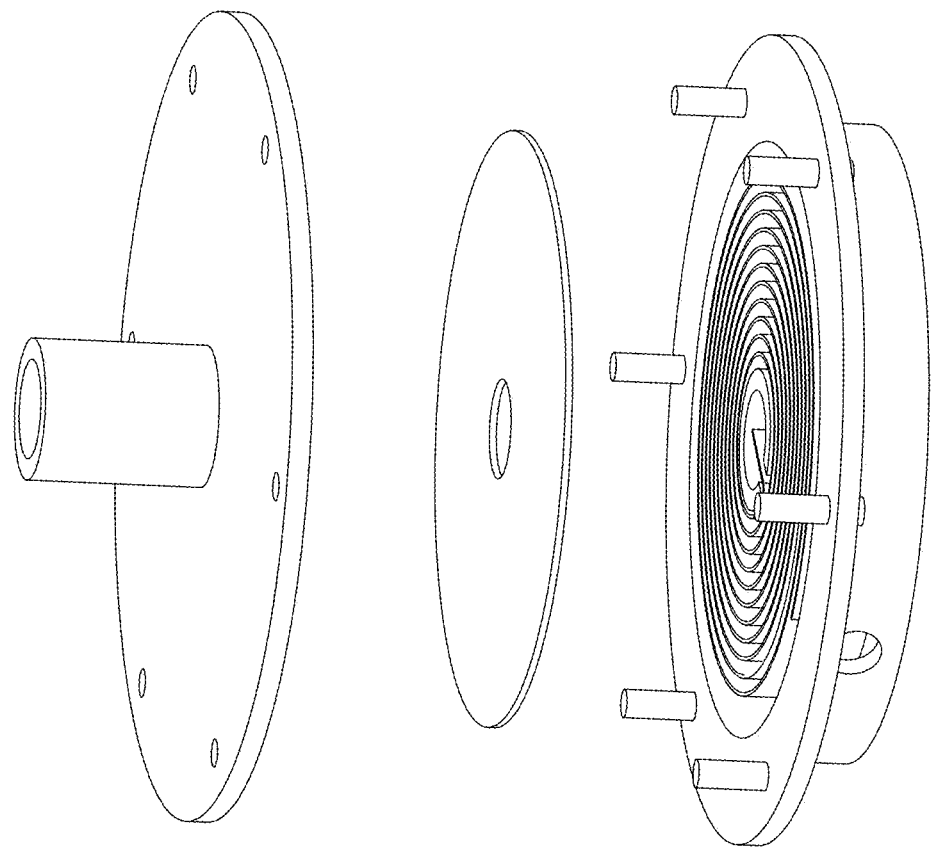

The disclosed microscale solid state catalyst reactor 100 may be used as a part of a larger process to perform the hydrotreating reactions, as illustrated by FIG. 13. Coconut oil 1100 contained in a tank 1300 can be moved using a pump 1305 through an oil pre-heater 1310 into the co-current, down-flow, vertical microscale reaction cell tower 100. Solid state catalyst reaction flow-cells may be in the form of tubes contained within a coconut oil filled shell, configured as a shell and tube heat exchanger 100. After the exothermic reaction starts up, the oil preheater shuts down and heat of reaction is absorbed by incoming reactant coconut oil in the reactor shell and by a tube of hydrogen gas passing up from the base and into the downflow reactor flow cells. Heat of reaction may be captured and recycled from shell-side coconut oil to incoming hydrogen gas in reaction gas heater 1315. Safe shutdown of the reactor may be accomplished by purging the system of hydrogen gas by use of nitrogen gas injection unit 1325.

Photovoltaic panels 1345 can be used to provide electricity to an electrolysis unit 1335, which may be supplied with purified water in liquid phase and water vapor steam from a solar sill 1355 to produce oxygen 1340 and hydrogen 1105. The final gaseous stream 1360 passes up through a heat transfer surface tube within the shell and combined in the reactor with the preheated coconut oil 1365 in downflow mode through linear microscale reactor flow cells within the reactor tower 100 to produce the products 1370, which comprise liquid C8-C14 alkanes suitable for use as biofuel and propane which may be sold as cooking gas.

Figure 9:
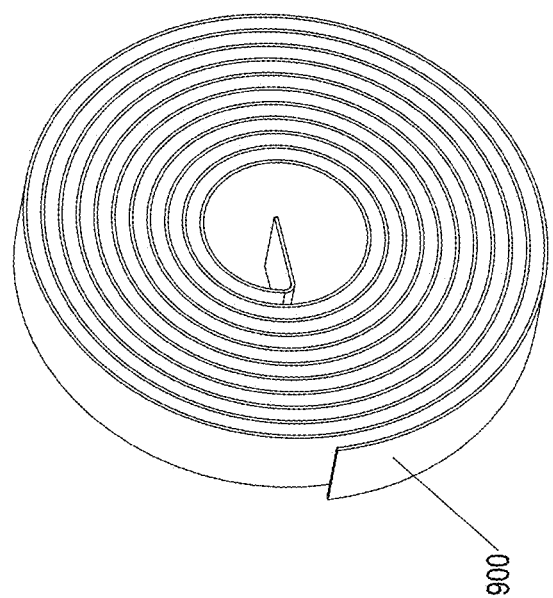
FIG. 9 is an example of a metallic ribbon which may be used in the catalyst production process according to this disclosure.
Figure 10:
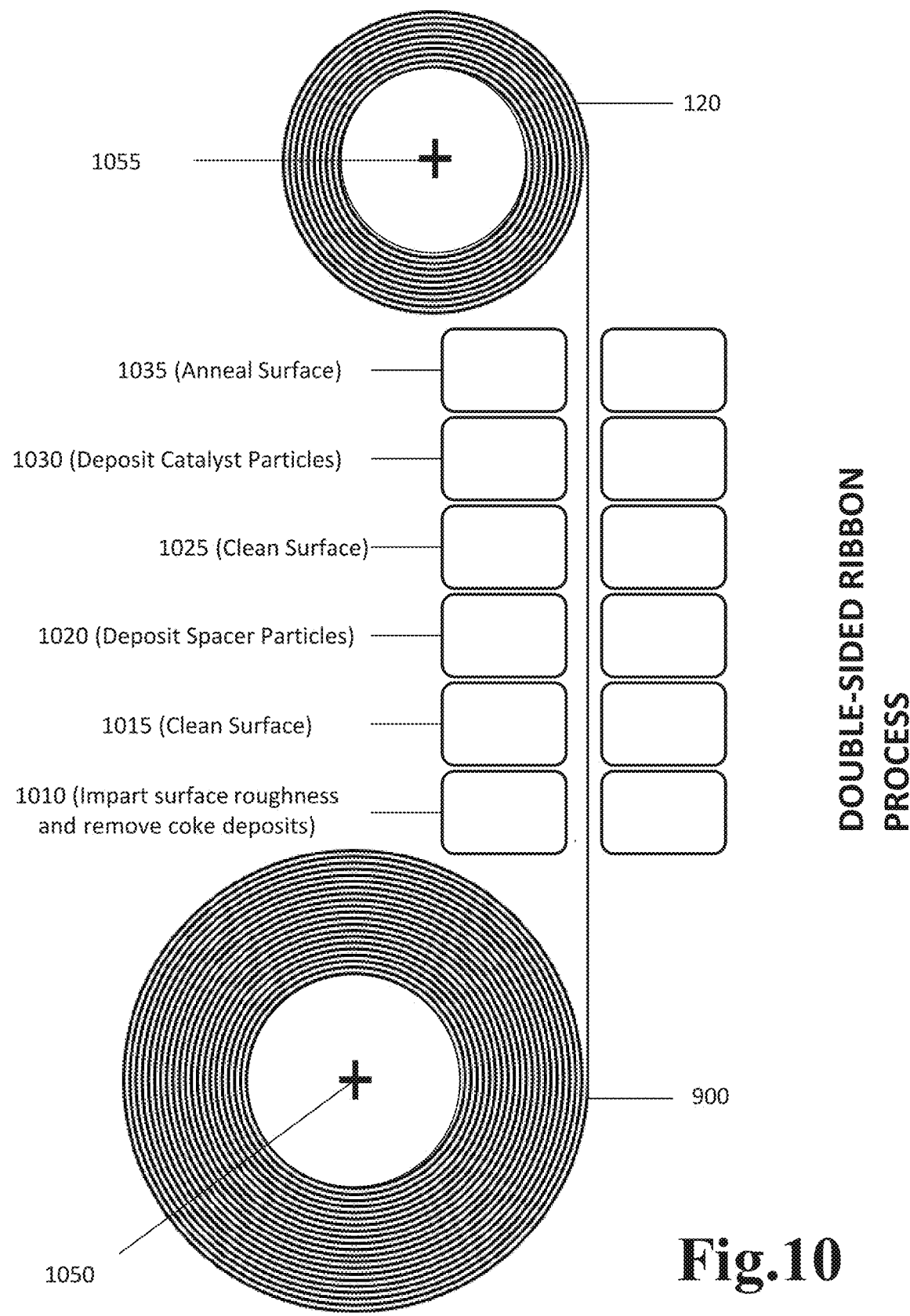
FIG. 10 shows an illustration of the double-sided catalyst production and refurbishing process according to this disclosure.

Another present embodiment may be a continuous process of steps to produce a catalytic surface suitable to form a microscale chemical reactor, illustrated by FIG. 10. A coiled metal ribbon, possibly stainless steel, as shown by FIG. 9, may be an ideal starting material. Continuous production of catalytic surface may be accomplished using: a coiled metal ribbon 900, attached to a first roller 1050, connected opposite a second roller 1055 which re-rolls the treated catalytic substrate 1055 into a coil suitable for use in a microscale reactor 100. The process of fabricating the metal ribbon 900 into a catalytic substrate 120 may be accomplished by: sandblasting with element 1010, cleaning by a first cleaning element 1015, treating with spacer particles 410 by a first deposition element 1020, cleaning by a second cleaning element 1025, treating with catalyst crystals 405 by a second deposition element 1030, optionally followed by an annealing element 1035, while traveling from the first roller 1050 to the second roller 1055.

The described catalyst fabrication process which treats a metal ribbon using a variety of different elements sequentially in a continuous rolling process may be a significant advance in fabrication of solid-state catalytic surfaces, as it may be relatively cheap and quick to produce large amounts of catalyst substrate suitable for use in microscale reactors. The description of metal ribbon does not imply a narrow ribbon. The catalytic surface can be wide as well.

The sanding step may be of value because engineered surface roughness may be needed to produce optimum boundary layer thickness and to increase the microscopic surface area of catalyst which may be exposed to the reactant fluids. Surface roughness can be imparted in a continuous process using subtractive methods including abrasive machining, sand-blasting, and microelectronics methods such as acid etch. Surface roughness can be imparted in a continuous process using additive methods from microelectronics manufacturing and 3D Printing techniques. Existing additive microelectronics fabrication processes may be employed to achieve deposition of spacer particles. These processes include registration of deposition on the X-Y axis using photolithography resist, photomask light exposure, and photolithography develop processes to position an engineered pattern of spacer metal structures and particles on the catalytic surface.

The catalyst deposition step to deposit small diameter catalyst particles on the metal lamella backing may be accomplished using conventional microelectronics and semiconductor manufacturing methods, such as sputter, chemical vapor deposition, atomic layer deposition, 3D printing, or gel solvent deposition.

Microscale reactor flow cells in which the gap between the opposing sheets of planar catalyst surface area is consistent can be achieved by deposition of spacer particles 410 with a desired height in the Z axis, relative to the planar catalyst surface in the X-Y axis. This may prevent opposing planar surfaces in a flow cell from pinching together, closing the flow path, and shutting down the reactor.

In a present embodiment, large particles serve as spacers to prevent an opposing planar surface from touching the catalytic planar surface which has spacer particles attached. This allows for the substrate 120 to be coiled around itself, into a spiral shape 130 creating a spiral flow path 125 with relative ease, and without having to worry about the coiling process pinching closed the spiral flow path. The re-coiled final treated catalyst substrate FIG. 10 at 120 may be suitable for use in a microscale reactor without further processing to accomplish the desired height along the Z axis. The present embodiment improves on prior art in microscale reactors where very precise positioning of the planar catalytic surfaces may be needed along the Z axis. The prior art is problematic because deviation from absolute planarity causes closure of gap and stopping of flow within the fluid flow-cell and because excessive gap causes reactants to pass outside the boundary layer. Prior art describes expensive catalytic plates with short flow-path, requiring optimum diffusion rate of reactants and fast reaction rate to accomplish needed extent of reaction. In the present embodiment, it may be relatively easy to wind the treated substrate into the spiral flow path, and one need not be concerned with the precise distance between the parallel catalytic surfaces in the winding process, because the spacer particles may keep them apart and because the length of the reaction flow path may be long, insuring adequate residence time and adequate contact with the catalytic surface, insuring sufficient extent of reaction.

The present embodiment solves a problem with prior art in which the gap along the Z axis which is too large, causing much of the reactant fluids to pass in the free-stream bulk flow regime and outside the boundary layer, resulting in reduced reactant contact with the catalytic surface relative to the reactant flow rate. In a present embodiment, low cost methods may ensure the gap between catalytic surfaces 211 is within a specified range, which may allow for microscale reactors to avoid costly methods to insure perfectly parallel reactor surfaces which are planar in the X-Y axis. The spacer particles can be a selected size which may allow for the catalytic substrate 120 to coil around itself into a spiral shape 130, with spiral flow path 125 with a gap along the Z axis 1605 of the approximate size necessary to allow for boundary layer 1601, which may span the gap along the Z axis 1605 and encompass the flow of reactants within boundary layer regime conditions for microchannel flow, especially under laminar flow 1600 conditions. The width of the boundary layer may be affected by fluid properties including: temperature, polarity, viscosity, density, chemical composition, and velocity. The hydraulic diameter of the reactor may affect the width of the boundary layer with a thinner boundary layer toward the center of the flow path. Intermolecular forces between the bulk fluid and the catalytic substrate 120, as well as intermolecular forces between the various chemical components of the fluid with each other within the bulk fluid may also affect thickness of the boundary layer. The gap between the catalytic surfaces 211 may be selected based upon the above considerations to provide a boundary layer of optimal thickness within the reactor under standard operating conditions.

In another embodiment, if increased mass transfer is desired, more numerous spacer particles 1710 can be used which may increase turbulence 1700 within the free-stream bulk flow along the Z axis 1705, leading to a thinner boundary layer 1706. In present embodiments, costs of reactor fabrication may be dramatically reduced by microscale reactor catalytic surfaces which may be reliably held an engineered distance apart in the Z axis by use of spacer particles.

Where turbulent flow is desired, the current microscale reactor 100 still achieves long catalytic surface contact distance, due to the long spiral flow path 125, which maintain long residence time while operating at higher fluid velocity. Higher fluid velocity promotes turbulent mixing of fluids due in part to interaction of spacer particles or structures within the reactor. Increased turbulence in fluid flow solves a problem with recent prior art, in which gas phase voids in the liquid portion of fluid reactant flow prevents the liquid wetting of solid-state catalyst planar surface and thereby ending chemical reaction at that dry catalyst surface. The result may be increased overall reaction rate and increased reactor productivity in the present embodiment.

Present embodiments using spacer particles may also be suitable for fabrication and use of parallel planar catalytic surfaces with a long run-distances of planar catalytic surfaces. Present embodiments can be used to reduce the cost of production of planar prior art catalytic reactors.

An example of a low-cost approach to deposit large spacer particles may be a mixture of large particles, mixed with solder metal, wherein the molten metal with a lower temperature of fusion, such as solder, is used to provide adhesion of large spacer particles to the metal backing in the X-Y plane.

A present embodiment includes continuous substrate preparation and catalyst deposition processes, occurring on both sides of a metal ribbon, as shown by FIG. 10. As shown in FIG. 5 and FIG. 2, double sided continuous strips 510 of microscale reactor catalytic surface may be sequentially stacked and assembled into final micro scale reactor flow cells 100, each made up of opposing metal lamella sheets 415 with catalyst particles 410 in the gap between the metal lamella 515. The double-sided continuous strips 510 may be layered one over another when the catalytic substrate 120 may be coiled around itself in the spiral reactor design such that each side of the parallel catalytic surfaces 210 contacts reactants throughout the spiral flow path 125 of the reactor.

Once a completed coiled substrate ribbon has finished the catalyst treatment process, it may be continuously rolled up into the spiral architecture and capped on each side with a flat structure 215. The cap 215 confines the fluid flow within the spiral flow path. A heat transfer element 200 may be placed between the cap and the catalytic substrate 120. Alternatively, assuming the cap 215 is composed of a metal, the cap 215 itself may serve as the heat transfer element 200.

In an additional embodiment, the cap 215 may be used to ensure that many parallel layers of catalytic substrate 210 may be held apart at an engineered distance 211 by use of groves in the side cap structure, in the same manner as a slider window frame which guides and confines sliding window glass. Alternatively, a plurality of small rods could stick out from the cap 125 and be positioned in between the parallel layers of catalytic substrate 210 to ensure they may be held apart at an engineered distance 211.

The combination of the present embodiments dramatically lowers the fabrication cost of microscale reactors and has the potential to bring microscale chemical reactors into the mainstream of chemical process technology and industrial practice. The added advantage of spiral configuration of parallel catalytic surfaces may be a reactor of small size and great catalytic surface area, delivering long reactant residence time.

Another present embodiment is a continuous process to refurbish a fouled reactor flow-cell catalyst surface coating, very similar to the process disclosed in FIG. 10. In this embodiment, the sanding element 1010 and first cleaning element 1015 may be of particular importance as they may be required to remove the soft-coke deposits left on a fouled catalytic surface. By removing the cap 215, placing the fouled coiled catalytic substrate on the first roller 1050, and continuously unwinding the spiral reactor; soft-coke deposits or other contamination may be removed through said sanding element 1010 and cleaning element 1015, and spacer particles and catalyst re-deposited by the first deposition element 1020 and second deposition elements 1030 respectively. The advantage of this embodiment may be a low-cost process to unwind and open-up microscale catalytic surfaces, refurbish the catalytically active surface, and continuously re-wind the renewed active surface into a coiled catalytic substrate 120 on a second roller 1055. This embodiment may be equally applicable to the biofilm embodiment disclosed herein, where the sanding element 1010 and first cleaning element 1015 remove the fouled surface of the biofilm, where the second deposition element 1030 redeposits the biofilm.

Such a low-cost method of cleaning and refurbishing a fouled catalytically active substrate allows for use of marginal, contaminated, impure, and otherwise inferior raw materials to be economically processed via hydrotreating reactions and bio-film reactions. Ordinarily, inferior raw materials would be avoided because the cost of replacement of the catalyst surface would outweigh any production cost savings from reduced price of inferior raw materials. The automated process where a fouled catalytic surface in a microscale chemical can reliably be refurbished with minimal effort allows for microscale hydrotreating reactors to be economically viable and thereby enable profitable production of biofuels on low price and lower quality raw materials.

The present embodiment represents a reduction in capital cost of reactors to process cheaper, inferior raw materials. Examples of such inferior, difficult to process raw materials may be pyrolysis oil and bio-oil arising from torrefaction processes, used to convert wood waste and agricultural waste into liquid phase bio-oil raw material for downstream hydrotreating reactions. Bio-oil from forest biomass and agricultural residue contain contaminates that cause soft-coke deposits and particulate deposits to form, which foul the catalyst, causing catalyst deactivation. The problem may be especially notable in prior art packed bed and prior art microscale chemical reactors.

The disclosed catalyst refabrication process solves an important problem which has prevented economically viable adoption of thermo-chemical processes to convert agricultural waste and waste forest biomass into useful liquid renewable low-carbon fuel products. This embodiment also solves the problem of high maintenance cost required to employ microscale reactors, reducing the total life cycle cost of microscale reactors. This embodiment delivers the ability to continuously clean long runs of planar solid-state catalyst surface area, and continuously redeposit fresh catalyst particles, and continuously assemble refurbished catalyst surface into complete reactor assemblies.

The sum the present embodiments can be combined to lower life cycle costs associated with refurbishing used microscale reactors, and dramatically lower the total cost associated with use of microscale reactors. Previously marginal projects to produce renewable low-carbon second generation biofuels and advanced third generation biofuels from waste will become economically viable, leading to a major advancement in energy security, reduction in the cost of biofuels, and reduction in greenhouse gas emissions, especially in isolated communities in the Asia Pacific region.

Figure 18:
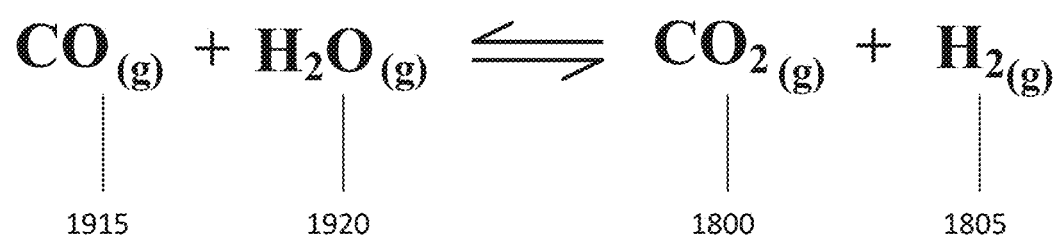
FIG. 18 shows a part of a water-gas shift reaction according to this disclosure.
Figure 19:
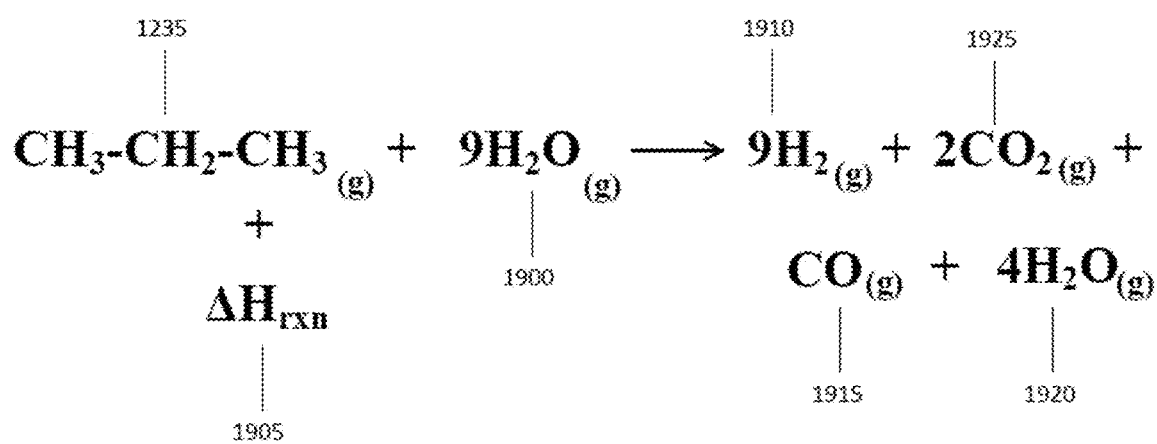
FIG. 19 shows a steam reforming reaction to produce hydrogen from natural gas and/or byproducts of hydrotreating which may be commercially important according to this disclosure.
Figure 20:
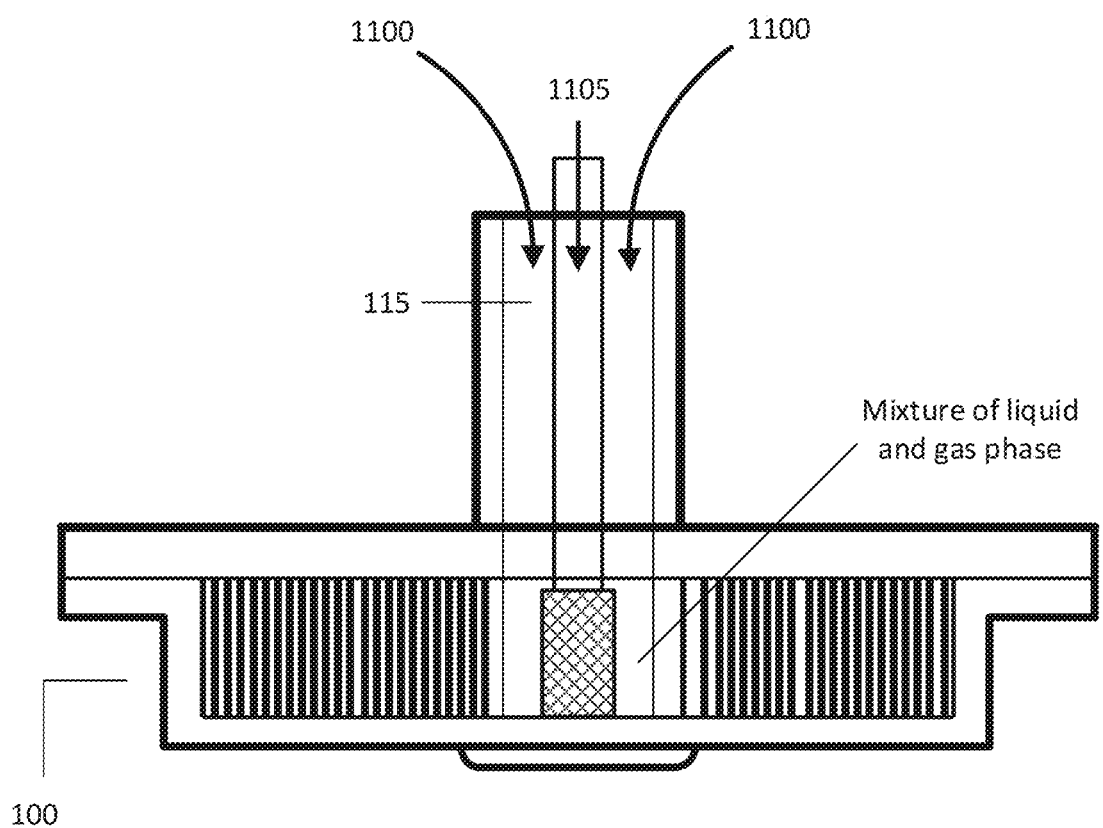
FIGS. 20 and 21 show a microscale reactor configured for use with a mix of liquid and gas phase flow according to this disclosure.
Figure 21:
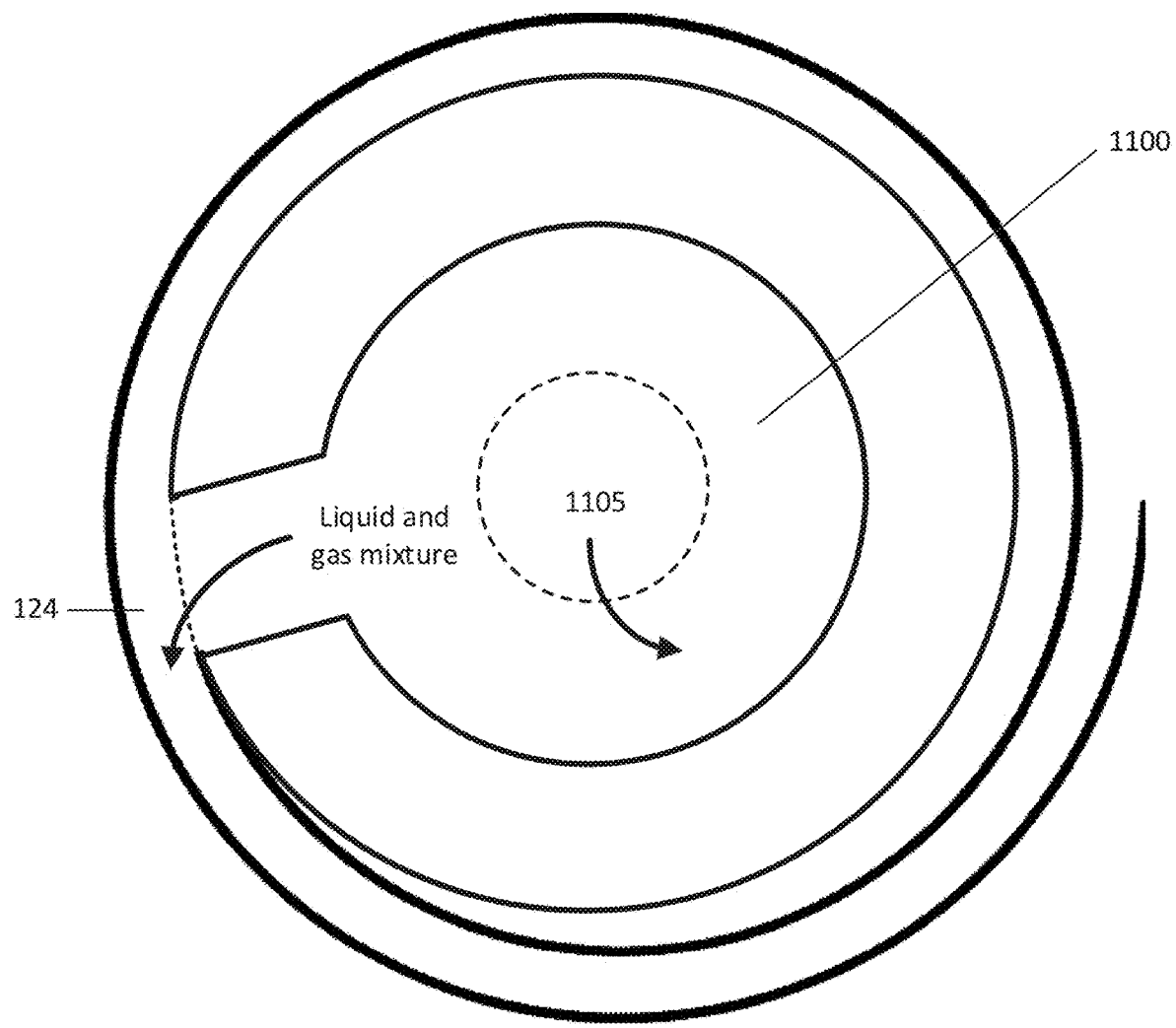
Figure 22:
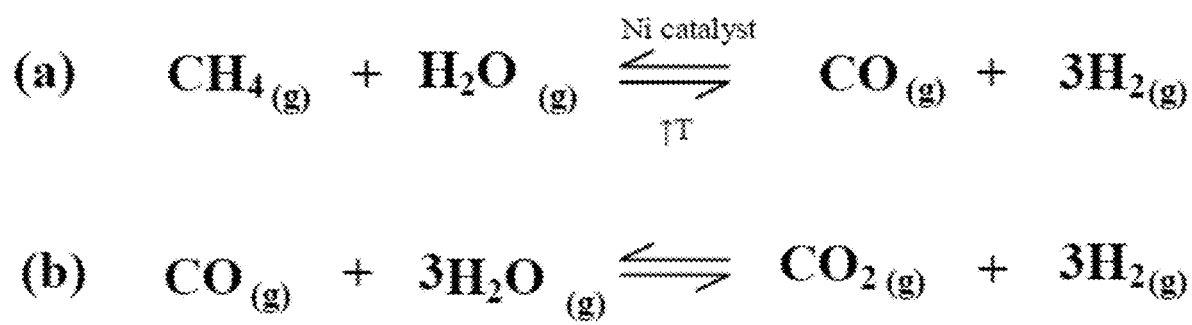
FIG. 22 shows a water-gas shift reaction that may begin with biogas according to this disclosure.
Figure 23:
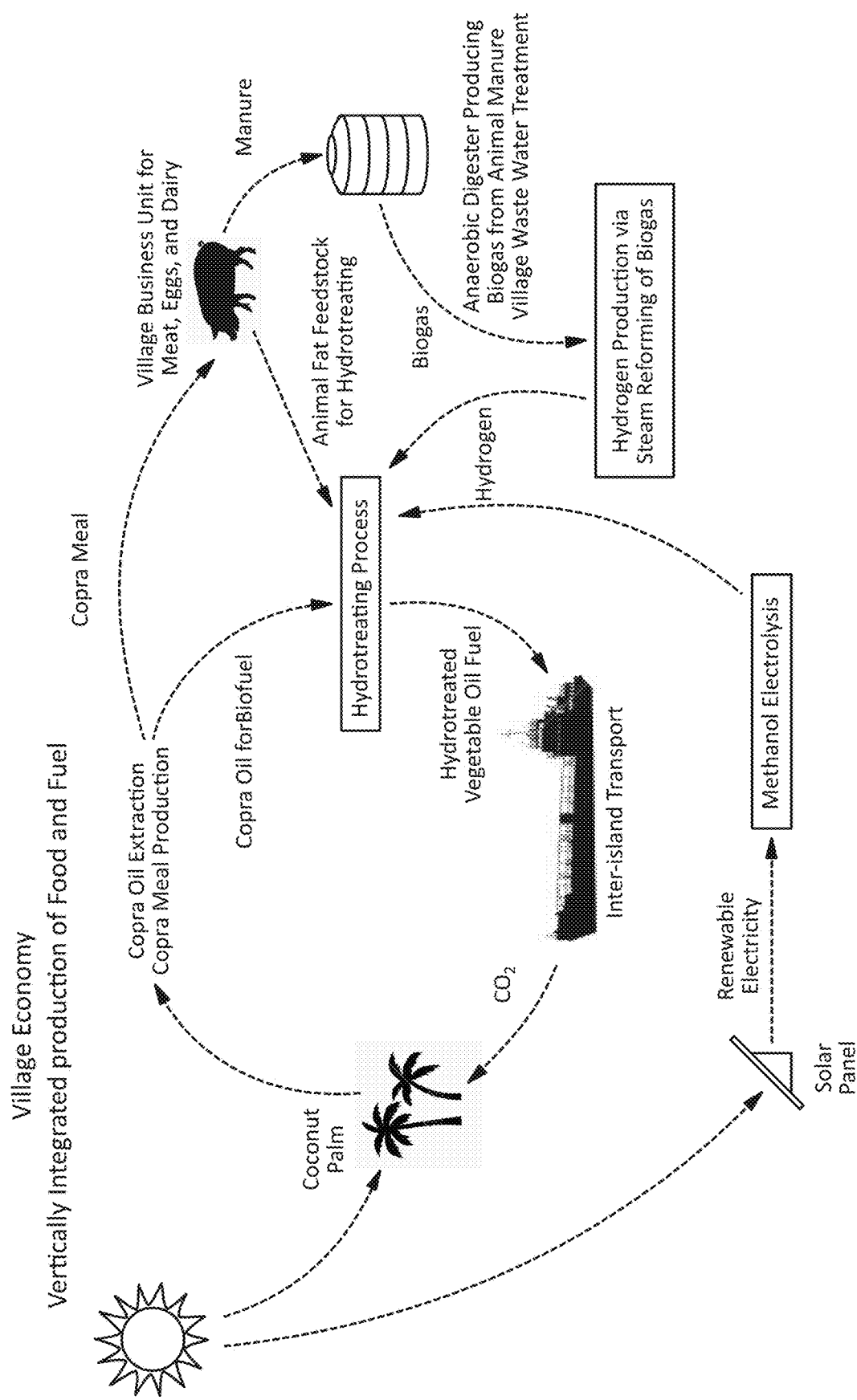
FIG. 23 shows an energy cycle in the South Pacific region and how the embodiments described herein fit into the larger cycle according to this disclosure.
Figure 24:
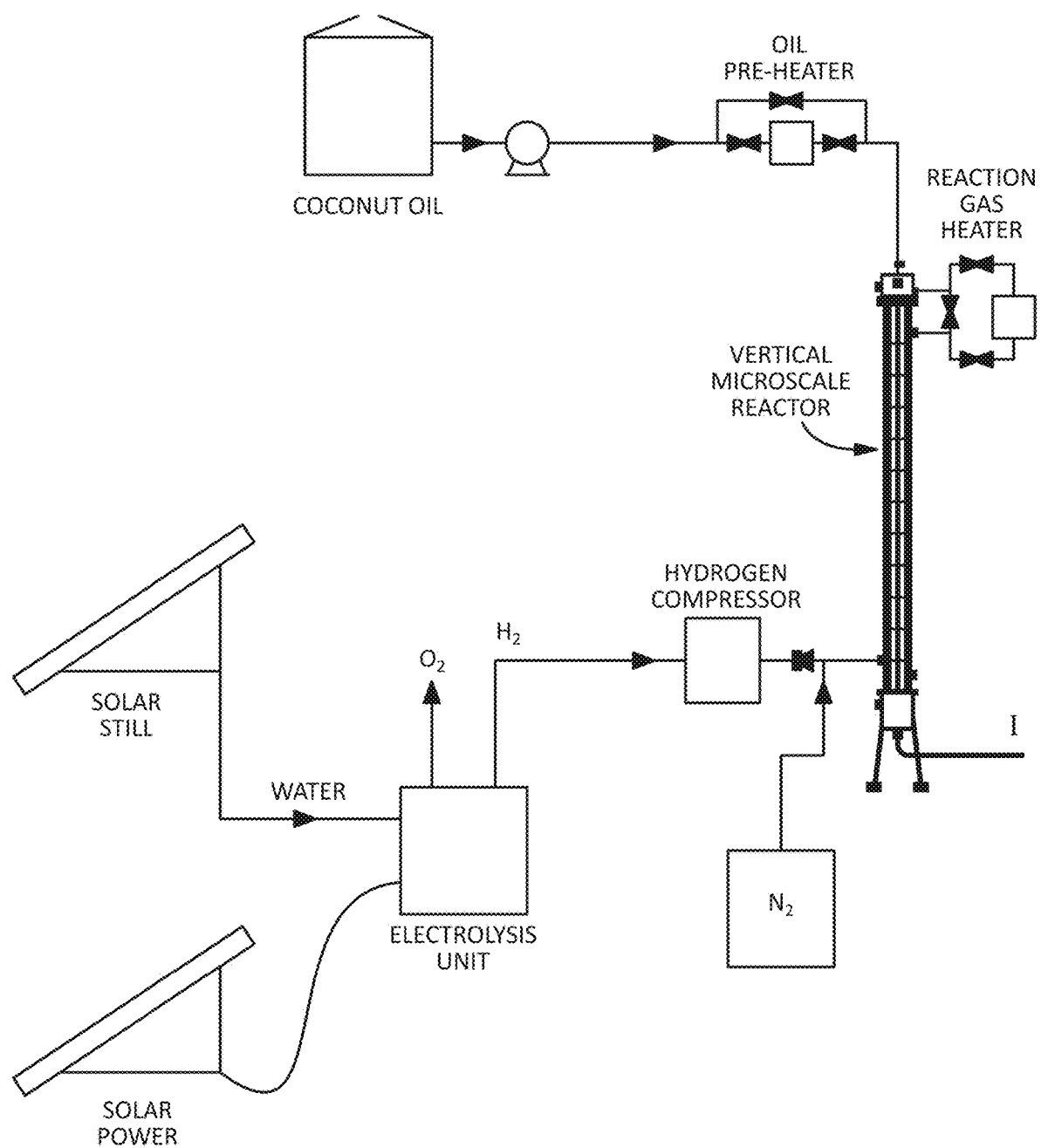
FIG. 24 illustrates a village scale hydrotreating system showing a linear variant of microscale reactor architecture in which the catalyst flow cell is vertically oriented in a tower configuration. The process shown are used for hydrotreating of coconut oil, combined with solar photo-voltaic electrolysis to produce renewable hydrogen.

Propane is a useful byproduct obtained from hydrotreating of triglycerides, but currently, propane, biogas, natural gas, and other petroleum refinery light ends produced in biofuel production processes are burned-off and not economically recovered. As a useful byproduct in the disclosed chemical reactions, it may be desirable to find a way to recover and utilize the propane. Hydrogen needed to perform hydrotreating reactions on triglycerides and fatty acids may be obtained via a renewable, low-carbon process. Using the disclosed microscale reactor architectures employing solid-state catalyst and the reactions of FIGS. 18-19; renewable hydrogen gas 1910 may be produced in a steam reforming reaction (FIG. 19) using propane 1235 and steam 1900 input at a high temperature and standard pressure to product hydrogen gas 1910, carbon dioxide 1925, carbon monoxide 1915 and steam 1920. This reaction may then be followed by a water gas-shift reaction (FIG. 18) where carbon monoxide 1915 is reacted with steam 1920 to produce carbon dioxide 1800 and more hydrogen gas 1805. In a reactor flow cell, it is likely the steam reforming reaction and water gas-shift reaction may occur simultaneously to produce the hydrogen gas 1910/1805. A catalyst may be used in the reactor cells to improve the efficiency of the reactors. Hydrogen produced from propane may be recycled to the above described biofuel production hydrotreating reactions, greatly reducing the requirement for new hydrogen to produce liquid second generation and advanced third generation biofuels.

Alternately, renewable hydrogen for production of low-carbon second generation Hydrotreated Vegetable Oil and Advanced Third Generation Renewable Diesel can be produced using solar based photovoltaic sourced electricity to perform electrolysis of water. A solar sill may be used to provide steam or hot water to the electrolysis unit.

An important advantage of low-cost microscale reactors performing hydrotreating reactions may be that the production rate may economically scaled down to meet the fuel consumption needs of villages and isolated communities with stranded supplies of coconut and palm oil raw material, who are at risk of supply disruption of expensive imported diesel fuel. Ordinarily, ships which supply fuel to such communities consume more fuel during transit then they deliver to these communities, and local production of biofuels would be highly beneficial the local communities. Local production of reliable marine diesel fuel to supply ships engaged in inter-island transport may reduce greenhouse gas emissions associated with unreliable petroleum diesel fuel delivery.

FIG. 14 shows an example a local energy cycle in the South Pacific in which the present embodiments may be used. Energy from the sun 1400 and $CO_2$ 1421 may be used by coconut and palm trees 1405 to produce coconut oil 1410, copra oil 1411, and copra meal 1412. The copra oil 1411 and coconut oil 1410 may be used as reactants in the hydrotreating process 1415 described herein to produce biofuel 1416. Copra meal 1412 can be fed to livestock 1425 which may produce animal fat 1427 which can be used as a reactant in the hydrotreating process to produce biofuel. The biofuels produced can be used for inter-island transport 1420 and as fuel for electricity generator diesel engines.

Manure 1426 from the livestock can be used to produce biogas 1431 in an anaerobic digester 1430. The biogas 1431 can be used to drive a steam reforming process 1435 to produce hydrogen 1363 for use in the hydrotreating process 1415. Photovoltaic solar panels 1445 can use solar energy to produce renewable electricity 1446 which can be used in an electrolysis process 1440 to produce renewable hydrogen 1441 for use the hydrotreating process 1415.

Production of premium quality renewable diesel fuel may lead to significant social and economic advantages in the Asia-Pacific region. The impact of local production of advanced biofuels includes creation of skilled labor jobs and increased family income. Increased energy security is a critical value to isolated island communities. Increased food supply results from a functioning bio-fuel plant in Pacific Island Countries because coconut oil is produced from expeller operations which also produce byproduct coconut meal, which is used as animal feed, called copra meal. When an economically viable biofuel plant is purchasing coconut oil, the result is increased supply of copra meal. Increased biofuel production on remote islands in the Asia Pacific region increases food supply, lowers prices for food, and increases energy and economic security.

Biofuels produced using the disclosed processes meets the regular diesel fuel quality specification ASTM D975 and may be suitable for use in modern diesel engines at 100% concentration, thereby making the maximum contribution to energy independence and greenhouse gas mitigation.

The inventive principles have the potential to achieve a breakthrough in $CO_2$ emissions reduction relative to other biofuels because biofuel can be net-negative on greenhouse gas emissions, calculated on a $CO_2$ equivalent basis, in the case where the project captures methane biogas which would otherwise be released to the atmosphere.

The disclosed embodiments serve to minimize the cost to produce catalytic substrate, maximizes the effective surface area available for reaction in a reactor and maximize conversion in the reactor. They also maximize the effective life of the catalyst, reducing fouling by ensuring optimal heat transfer away from the catalytic surface. Taken together, the inventive principles significantly reduce the cost to produce complete reactor assemblies and remarkably improve the efficacy, utility, and commercial viability of microscale reactor technology by solving several problems with prior art that has held back commercial acceptance of microscale reactors for production of advanced biofuels from natural sources of fatty acids and triglycerides.

For purposes of illustration, the inventive principles of this patent disclosure are described in the context of some example embodiments showing specific implementation details such as dimensions, materials, etc., but the examples can be modified in arrangement and detail without departing from the inventive concepts. One of ordinary skill in the art will recognize the inventive principles are not limited to the embodiments disclosed herein, and that various aspects of the disclosed embodiments can be combined to achieve additional embodiments. For example, in some embodiments, the reactor substrate may also be arranged in another configuration, for example in a linear configuration. In some embodiments, any or all of the reactor components may be made of plastic. Examples of applications where plastic components may be beneficial include water treatment, for example with a biofilm on the substrate. As another example, the double-sided ribbons, catalyst substrates, etc., may be implemented in single-sided embodiments as well. Multiple single-sided substrates may be arranged back-to-back to essentially form a double-sided substrate. Different reactive coatings may be applied to different sides of the substrate. Any number of stations or stages or phases having apparatus configured to perform any type of operation on a continuously fed substrate such as cleaning, preparing a surface, depositing a reactive coating on the substrate, etc. In various embodiments, some stations or stages or phases may be omitted and others may be added.

Use of the terms "first", "second", etc. in the disclosure and claims does not necessary imply any order of use, arrangement, etc., but may be for purposes of distinguishing different elements. "Producing" may refer to original manufacturing and/or refurbishing or otherwise processing.

The invention claimed is:

1. A method of producing a reactive component comprising:
   continuously feeding a substrate past a first processing apparatus, wherein the first processing apparatus deposits a reactive substance on the substrate;
   applying spacers to the substrate;
   stacking a first portion of the substrate and a second portion of the substrate to form a microscale reactor flow cell; and
   producing hydrogen within the microscale reactor flow cell.

2. The method of claim 1 further comprising continuously feeding the substrate past a second processing apparatus, wherein the second processing apparatus prepares a surface of the substrate to receive the reactive substance.

3. The method of claim 1 wherein the reactive coating comprises a catalytic coating.

4. The method of claim 1 wherein the reactive coating comprises a biofilm.

5. The method of claim 1 wherein the substrate has previously been used as part of a reactive component.

6. The method of claim 1 further comprising applying spacers to the substrate.

7. The method of claim 1, wherein the microscale reactor flow cell has a spiral shape.

8. The method of claim 1, wherein the microscale reactor flow cell has a linear shape.

9. The method of claim 1, wherein the first portion of the substrate and the second portion of the substrate are locally planar within a microscale distance.

10. The method of claim 9, wherein the first portion of the substrate and the second portion of the substrate are spaced a distance to allow for a boundary layer between the first portion of the substrate and the second portion of the substrate.

11. The method of claim 10, wherein the distance allows a flow of reactants within a space determined by a boundary layer.

12. The method of claim 11, wherein the distance allows a flow of reactants within boundary layer regime conditions under laminar flow conditions.

13. The method of claim 10, wherein the spacers are arranged to provide turbulence within a free-stream bulk flow, thereby reducing a boundary layer.

14. The method of claim 1, wherein the spacers comprise spacer particles.

15. The method of claim 1, wherein the spacers comprise spacer metal structures.

16. The method of claim 1, further comprising performing a hydrotreating reaction in the microscale reactor flow cell.

17. The method of claim 1, wherein continuously feeding the substrate comprises:
   unrolling the substrate from a first reel; and
   rolling the substrate onto a second reel.

18. The method of claim 1, wherein producing hydrogen comprises using refinery light ends as feedstock.

19. The method of claim 18, wherein the refinery light ends comprise petroleum refinery light ends.

20. The method of method of claim 1, wherein producing hydrogen comprises using propane as feedstock.

21. The method of claim 1, wherein producing hydrogen comprises using biogas as feedstock.

22. The method of claim 1 producing hydrogen comprises using natural gas as feedstock.

23. The method of claim 1, wherein producing hydrogen further comprises using steam as an input.

\* \* \* \* \*